US012654954B2

(12) United States Patent
Sun et al.

(10) Patent No.: US 12,654,954 B2
(45) Date of Patent: Jun. 16, 2026

(54) CONTAINER TAKING AND CONVEYING ASSEMBLY, LOADING AND UNLOADING DEVICE, AND PICKING SYSTEM

(71) Applicant: BEIJING GEEKPLUS TECHNOLOGY CO., LTD., Beijing (CN)

(72) Inventors: Qin Sun, Beijing (CN); Jie Yan, Beijing (CN); Qiming Wang, Beijing (CN); Mengdi Wang, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 229 days.

(21) Appl. No.: 18/574,363

(22) PCT Filed: Sep. 5, 2022

(86) PCT No.: PCT/CN2022/117009
§ 371 (c)(1),
(2) Date: Dec. 27, 2023

(87) PCT Pub. No.: WO2023/061103
PCT Pub. Date: Apr. 20, 2023

(65) Prior Publication Data
US 2024/0294342 A1       Sep. 5, 2024

(30) Foreign Application Priority Data

Oct. 15, 2021   (CN) .......................... 202111205501.X
Oct. 15, 2021   (CN) .......................... 202111205928.X
(Continued)

(51) Int. Cl.
B65G 1/06          (2006.01)
B65G 1/04          (2006.01)
B65G 47/90        (2006.01)

(52) U.S. Cl.
CPC ........... *B65G 47/90* (2013.01); *B65G 1/0407* (2013.01); *B65G 2201/0235* (2013.01)

(58) Field of Classification Search
CPC ...... B65G 1/0407; B65G 1/0435; B65G 1/06; B65G 47/901
See application file for complete search history.

(56) References Cited

U.S. PATENT DOCUMENTS 5,380,139 A  *  1/1995  Pohjonen ............. B65G 1/0435
                                                          414/280
5,421,685 A  *  6/1995  Elmer .................. B65G 1/0435
                                                          414/280
(Continued)

FOREIGN PATENT DOCUMENTS

CN        1891582        1/2007
CN        102689762      9/2012
(Continued)

OTHER PUBLICATIONS

WIPO, International Search Report for PCT/CN2022/117009, Nov. 28, 2022.
(Continued)

*Primary Examiner* — Douglas A Hess
(74) *Attorney, Agent, or Firm* — Hodgson Russ LLP

(57) ABSTRACT
A container taking and conveying assembly includes: a base; a bearing assembly configured to bear a container and defining an accommodating space for accommodating the container; a taking and placing assembly configured to take out the container from a first target position and load the container onto the bearing assembly, or unload the container from the bearing assembly and place the container at a second target position; and a moving assembly configured to drive the taking and placing assembly to move in a first movement trajectory where the moving assembly is configured to drive the taking and placing assembly to move in the
(Continued)

accommodating space to load or unload the container, and a second movement trajectory where the moving assembly is configured to drive the taking and placing assembly to leave the accommodating space to allow the container to enter the accommodating space and be borne on the bearing assembly.

20 Claims, 11 Drawing Sheets

(30)        Foreign Application Priority Data

Oct. 15, 2021    (CN) .......................... 202122495320.7
Oct. 15, 2021    (CN) .......................... 202122497170.3

(56)                References Cited

U.S. PATENT DOCUMENTS

| | | | |
|---|---|---|---|
| 9,738,448 B1 | 8/2017 | Yamagishi | |
| 10,322,875 B2 * | 6/2019 | De Vries | B65G 1/0435 |
| 11,130,242 B1 | 9/2021 | Kalm et al. | |
| 11,794,995 B2 * | 10/2023 | Cheng | B25J 9/104 |
| 11,858,736 B2 * | 1/2024 | Zhan | B65G 1/0435 |
| 11,885,882 B1 * | 1/2024 | Kalm | G01B 11/026 |
| 12,421,031 B1 * | 9/2025 | Hogan | B66F 9/02 |
| 2009/0162176 A1 | 6/2009 | Link et al. | |
| 2016/0194153 A1 | 7/2016 | Issing et al. | |
| 2016/0200513 A1 | 7/2016 | Hellenbrand et al. | |

FOREIGN PATENT DOCUMENTS

| | | | |
|---|---|---|---|
| CN | 105314310 | 2/2016 | |
| CN | 106241166 | 12/2016 | |
| CN | 106477217 | 3/2017 | |
| CN | 107452154 | 12/2017 | |
| CN | 207684454 | 8/2018 | |
| CN | 108928591 | 12/2018 | |
| CN | 109878958 | 6/2019 | |
| CN | 110092122 | 8/2019 | |
| CN | 110342167 | 10/2019 | |
| CN | 111470242 | 7/2020 | |
| CN | 211811609 | 10/2020 | |
| CN | 212291495 | 1/2021 | |
| CN | 212402315 | 1/2021 | |
| CN | 112573054 | 3/2021 | |
| CN | 212768487 | 3/2021 | |
| CN | 112660819 | 4/2021 | |
| CN | 213059096 | 4/2021 | |
| CN | 213562634 | 6/2021 | |
| CN | 213621674 | 7/2021 | |
| CN | 214192445 | 9/2021 | |
| CN | 113525991 | 10/2021 | |
| CN | 215902242 | 2/2022 | |
| CN | 216188197 | 4/2022 | |
| CN | 216735893 | 6/2022 | |
| DE | 3247158 | 7/1983 | |
| DE | 3607910 | 6/1987 | |
| DE | 102023134190 A1 * | 6/2024 | .......... B65G 47/917 |
| EP | 1285866 A1 * | 2/2003 | .......... B65G 1/0435 |
| EP | 3135609 | 3/2017 | |
| EP | 3406543 | 11/2018 | |
| EP | 3268301 | 8/2019 | |
| FR | 2158399 | 6/1973 | |
| JP | S51135079 | 11/1976 | |
| JP | S5391275 | 8/1978 | |
| JP | S57199704 | 12/1982 | |
| JP | H04112107 | 4/1992 | |
| JP | H07309406 | 11/1995 | |
| JP | H09162257 | 6/1997 | |
| JP | H09202408 | 8/1997 | |
| JP | H1129207 | 2/1999 | |
| JP | 2002002909 | 1/2002 | |
| JP | 2005138949 | 6/2005 | |
| JP | 2005225582 | 8/2005 | |
| JP | 2007015780 | 1/2007 | |
| JP | 2008120519 | 5/2008 | |
| JP | 2009280302 | 12/2009 | |
| JP | 2009286615 | 12/2009 | |
| JP | 2011057334 | 3/2011 | |
| JP | 2013234048 | 11/2013 | |
| JP | 2016169062 | 9/2016 | |
| JP | 2016210518 | 12/2016 | |
| JP | 2018115051 | 7/2018 | |
| WO | 2019242864 | 12/2019 | |
| WO | 2020111013 | 6/2020 | |
| WO | WO-2023061459 A1 * | 4/2023 | .......... G06Q 10/08 |
| WO | WO-2024021395 A1 * | 2/2024 | .......... B66F 9/07 |

OTHER PUBLICATIONS

JPO, Office Action for JP Application No. 2023-579052, Jan. 28, 2025.

EPO, Extended European Search Report for EP Application No. 22880047.0, Apr. 7, 2025.

CNIPA, First Office Action for CN Application No. 202111205928. X, Apr. 24, 2025.

CNIPA, First Office Action for CN Application No. 202111205501. X, May 10, 2025.

CNIPA, First Office Action for CN Application No. 202111250978. X, Jul. 11, 2025.

WIPO, International Search Report and Written Opinion for PCT/CN2022/122129, Dec. 14, 2022.

JPO, Office Action for JP Application No. 2023-580904, Dec. 17, 2024.

TIPO, Office Action for TW Application No. 111132431, Jul. 7, 2023.

EPO, Extended European Search Report for EP Application No. 22880162.7, Apr. 8, 2025.

KIPO, Office Action for KR Application No. 10-2024-7000098, Sep. 8, 2025.

KIPO, Office Action for KR Application No. 10-2024-7000096, Sep. 8, 2025.

\* cited by examiner

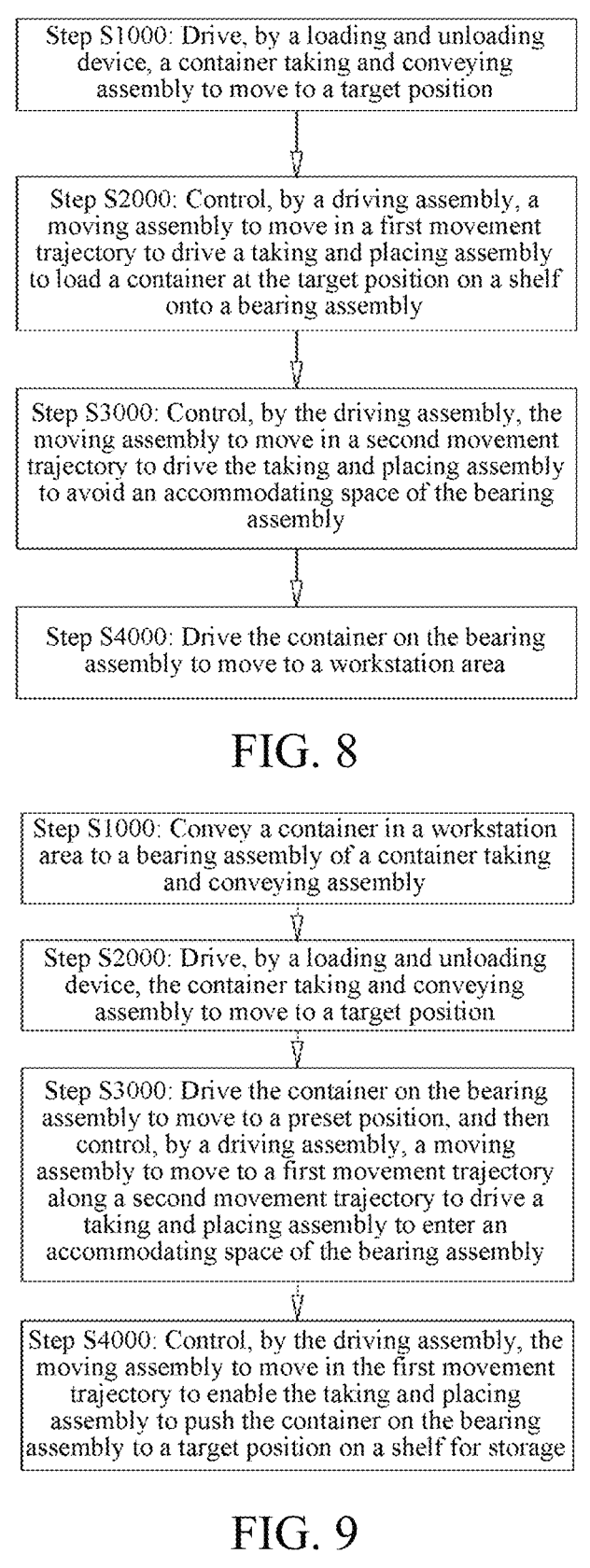

Step S1000: Drive, by a loading and unloading device, a container taking and conveying assembly to move to a target position Step S2000: Control, by a driving assembly, a moving assembly to move in a first movement trajectory to drive a taking and placing assembly to load a container at the target position on a shelf onto a bearing assembly Step S3000: Control, by the driving assembly, the moving assembly to move in a second movement trajectory to drive the taking and placing assembly to avoid an accommodating space of the bearing assembly Step S4000: Drive the container on the bearing assembly to move to a workstation area

FIG. 8

Step S1000: Convey a container in a workstation area to a bearing assembly of a container taking and conveying assembly Step S2000: Drive, by a loading and unloading device, the container taking and conveying assembly to move to a target position Step S3000: Drive the container on the bearing assembly to move to a preset position, and then control, by a driving assembly, a moving assembly to move to a first movement trajectory along a second movement trajectory to drive a taking and placing assembly to enter an accommodating space of the bearing assembly Step S4000: Control, by the driving assembly, the moving assembly to move in the first movement trajectory to enable the taking and placing assembly to push the container on the bearing assembly to a target position on a shelf for storage

FIG. 9

CONTAINER TAKING AND CONVEYING ASSEMBLY, LOADING AND UNLOADING DEVICE, AND PICKING SYSTEM

CROSS-REFERENCE TO RELATED APPLICATIONS

The present application is a national stage entry under 35 U.S.C. § 371 of International Application No. PCT/CN2022/117009, filed on Sep. 5, 2022, which claims priority to Chinese Patent Application No. 202111205928.X, filed on Oct. 15, 2021, Chinese Patent Application No. 202122497170.3, filed on Oct. 15, 2021, Chinese Patent Application No. 202111205501.X, filed on Oct. 15, 2021, and Chinese Patent Application No. 202122495320.7, filed on Oct. 15, 2021. The entire disclosures of the above-identified applications are incorporated herein by reference.

TECHNICAL FIELD

The present disclosure relates to the field of logistics, and more accurately, to a container taking and conveying assembly. The present disclosure further relates to a loading and unloading device including the container taking and conveying assembly, and a picking system.

BACKGROUND

At present, automated warehousing systems have been increasingly applied in various civilian and industrial warehousing fields, which use handling equipment such as stackers to shuttle through alleys between shelves, and replace manual picking and handling of goods on shelves. In dense warehousing systems, shelves are arranged densely and compactly. The current handling equipment is difficult to adapt to narrow roadway spaces between the shelves, making it impossible to use in the dense warehousing systems.

SUMMARY

According to a first aspect of the present disclosure, the present disclosure provides a container taking and conveying assembly including a base and the following assemblies located on the base: a bearing assembly configured to bear a container, an accommodating space for accommodating the container being formed on the bearing assembly; a taking and placing assembly configured to take out the container from a first target position and load the container onto the bearing assembly, or unload the container from the bearing assembly and place the container at a second target position; and a moving assembly configured to drive the taking and placing assembly to move in a first movement trajectory and a second movement trajectory, in the first movement trajectory, the moving assembly being configured to drive the taking and placing assembly to move in the accommodating space of the bearing assembly to load or unload the container; and in the second movement trajectory, the moving assembly being configured to drive the taking and placing assembly to leave the accommodating space of the bearing assembly to allow the container to enter the accommodating space and be borne on the bearing assembly.

According to a second aspect of the present disclosure, the present disclosure further provides a loading and unloading device, including a rack body, the above container taking and conveying assembly being arranged on the rack body, and the container taking and conveying assembly being configured to move on the rack body.

According to a third aspect of the present disclosure, the present disclosure further provides a picking system, including: a workstation area in which a picking station is arranged; a goods shelf parking area configured to park a goods shelf; and the above loading and unloading device configured to transfer the container between the workstation area and the goods shelf.

Other features and advantages of the present disclosure will become clear through the detailed description of the exemplary embodiments of the present disclosure with reference to the drawings below:

BRIEF DESCRIPTION OF THE DRAWINGS

The drawings which are incorporated into and form a part of the description, illustrate the embodiments of the present disclosure and are used together with the description thereof to explain the principle of the present disclosure.

FIG. 8 illustrates a flowchart of a container taking method according to an embodiment of the present disclosure.

FIG. 9 illustrates a flowchart of a container conveying method according to an embodiment of the present disclosure.

DETAILED DESCRIPTION

Figure 1:
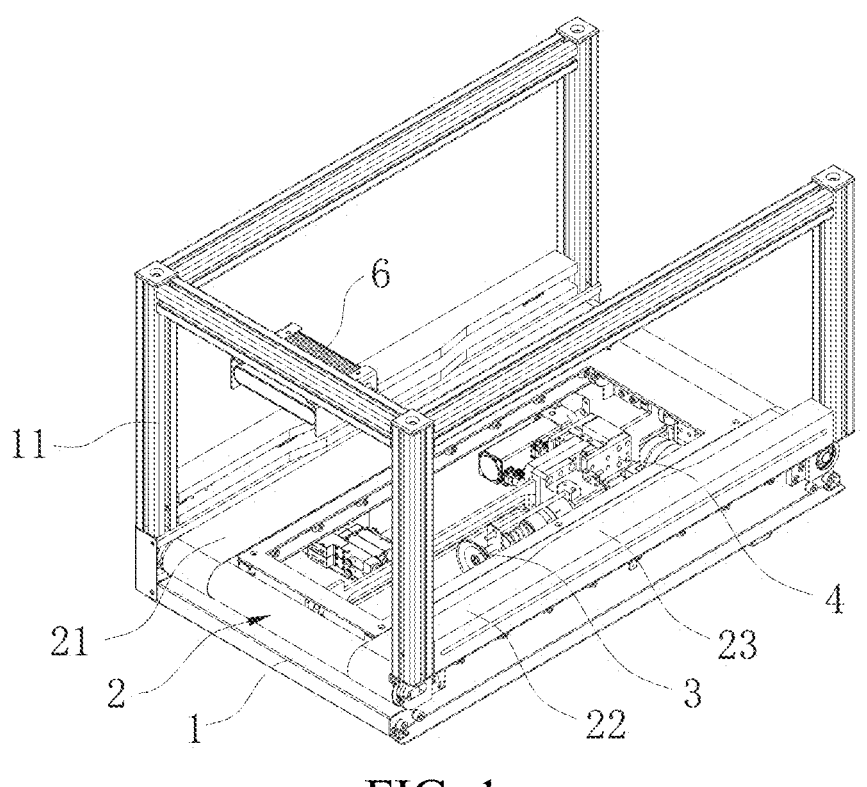
FIG. 1 illustrates an overall schematic structural diagram of a container taking and conveying assembly according to an embodiment of the present disclosure.

The exemplary embodiments of the present disclosure will be described below in detail with reference to the drawings. It is to be noted that unless otherwise specified, the relative arrangements, numerical expressions, and numerical values of the components and steps described in these embodiments do not limit the scope of the present disclosure.

The following description of at least one exemplary embodiment is actually only descriptive and does not constitute any limitation on the present disclosure and its application or use.

The techniques, methods and equipment known to those skilled in the art may not be discussed in detail, but in appropriate cases, the techniques, methods and equipment should be considered as part of the description.

In all the examples shown and discussed here, any specific value should be interpreted as merely exemplary rather than restrictive. Therefore, other examples of exemplary embodiments may have different values.

It is to be noted that similar reference signs and letters represent similar items in the following drawings. Therefore, once an item is defined in one drawing, it does not need to be further discussed in subsequent drawings.

The specific embodiments of the present disclosure will be described below with reference to the drawings.

Herein, "up", "down", "front", "back", "left", "right" and the like are only intended to represent the relative positional relationships between related parts, rather than limit the absolute positions of these related parts.

Herein, "first", "second" and the like are only intended to distinguish each other, rather than indicate the degree and order of importance, as well as the premise of mutual existence.

Herein, "equal", "same" and the like are not strictly mathematical and/or geometric limitations, but also include errors that can be understood by those skilled in the art and allowed for manufacturing or use.

Unless otherwise specified, each numerical range herein includes not only the entire range within its two endpoints, but also several sub-ranges included within it.

According to a first aspect of the present disclosure, the present disclosure provides a container taking and conveying assembly including a base and the following assemblies located on the base: a bearing assembly configured to bear a container, an accommodating space for accommodating the container being formed on the bearing assembly; a taking and placing assembly configured to take out the container from a first target position and load the container onto the bearing assembly, or unload the container from the bearing assembly and place the container at a second target position; and a moving assembly configured to drive the taking and placing assembly to move in a first movement trajectory and a second movement trajectory, in the first movement trajectory, the moving assembly being configured to drive the taking and placing assembly to move in the accommodating space of the bearing assembly to load or unload the container; and in the second movement trajectory, the moving assembly being configured to drive the taking and placing assembly to leave the accommodating space of the bearing assembly to allow the container to enter the accommodating space and be borne on the bearing assembly.

In an embodiment of the present disclosure, the moving assembly includes a guiding mechanism and a sliding mechanism; the guiding mechanism includes a first guiding part and a second guiding part communicated with each other, and the sliding mechanism is configured to move along the first guiding part and the second guiding part; and the first guiding part and the second guiding part respectively define the first movement trajectory and the second movement trajectory of the sliding mechanism.

In an embodiment of the present disclosure, the first guiding part is configured to extend linearly in a horizontal direction; the second guiding part and the first guiding part are located in different directions; the sliding mechanism is configured to move along the first guiding part, during which the taking and placing assembly moves in a linear direction in the accommodating space of the bearing assembly; and the sliding mechanism is configured to move along the first guiding part to the second guiding part, after which the taking and placing assembly moves in a manner of gradually leaving the accommodating space of the bearing assembly.

In an embodiment of the present disclosure, the sliding mechanism is configured to move in place along the second guiding part, after which the taking and placing assembly is configured to move to one side of the bearing assembly to avoid the accommodating space of the bearing assembly.

In an embodiment of the present disclosure, the second guiding part is configured to be located above the first guiding part; and the moving assembly is configured to move in place along the second guiding part, after which the taking and placing assembly is configured to move to a position above the bearing assembly to avoid the accommodating space of the bearing assembly.

In an embodiment of the present disclosure, the second guiding part is configured to be located below the first guiding part; and the moving assembly is configured to move in place along the second guiding part, after which the taking and placing assembly is configured to move to a position below the bearing assembly to avoid the accommodating space of the bearing assembly.

In an embodiment of the present disclosure, the moving assembly is configured to move along the second guiding part to a position where the taking and placing assembly is lower than a bearing surface of the bearing assembly.

In an embodiment of the present disclosure, the first guiding part and the second guiding part are guiding grooves arranged in the guiding mechanism, and the second guiding part is configured to obliquely extend downwards from an end of the first guiding part.

In an embodiment of the present disclosure, the first guiding part and the second guiding part are located in the same plane; and the sliding mechanism includes: a fixed part controlled by the driving assembly to move linearly in a direction in parallel with a plane in which the first guiding part and the second guiding part are located; and a sliding part slidably fitted with the fixed part and guidably fitted in the first guiding part and the second guiding part; and the taking and placing assembly is arranged on the sliding part.

In an embodiment of the present disclosure, the driving assembly is a pulley structure. and the fixed part is connected to a conveyor belt of the pulley structure.

In an embodiment of the present disclosure, a guiding rod guidably fitted with the fixed part is arranged on the guiding mechanism; and the fixed part is configured to move linearly along an extension direction of the guiding rod under the drive of the conveyor belt.

In an embodiment of the present disclosure, the guiding mechanism includes a guiding plate distributed relative to a vertical direction, and an upper end surface of the guiding plate is lower than a bearing surface of the bearing assembly.

In an embodiment of the present disclosure, the taking and placing assembly includes a suction cup mechanism, and the suction cup mechanism is configured to be fitted with an end surface of the container.

In an embodiment of the present disclosure, the taking and placing assembly includes a fixed seat, and a buffer device is arranged between the suction cup mechanism and the fixed seat.

In an embodiment of the present disclosure, the container taking and conveying assembly further includes a detection device, the detection device is configured to detect the container, and the taking and placing assembly places the container on the bearing assembly in a case that the container is detected.

In an embodiment of the present disclosure, in a case that the detection device detects the container, the moving assembly is located at a position where the first movement trajectory and the second movement trajectory are communicated.

In an embodiment of the present disclosure, the container taking and conveying assembly further includes a positioning system arranged on the base, and the positioning system is configured to determine relative positions of the container taking and conveying assembly and a goods shelf.

In an embodiment of the present disclosure, the positioning system is a visual scanning module, a laser scanning module, or an infrared scanning module.

In an embodiment of the present disclosure, a bracket is arranged on the base, and the positioning system is located on the bracket.

In an embodiment of the present disclosure, the first target position and the second target position are the same position or different positions.

In an embodiment of the present disclosure. the container taking and conveying assembly includes a first open end and a second open end; and the bearing assembly is a conveying belt, and the conveying belt is configured to drive the container to move to the first open end or the second open end of the container taking and conveying assembly.

In an embodiment of the present disclosure, two conveying belts are arranged, the two conveying belts are located at edge positions of the container taking and conveying assembly at an interval; and a space for the taking and placing assembly to move to a position below the conveying belts is formed between the two conveying belts.

In an embodiment of the present disclosure, the conveying belt is arranged on the base; and anti-falling blocking edges are arranged on two sides of the base, and the anti-falling blocking edges are configured to limit the container on the conveying belt.

In an embodiment of the present disclosure, a centering guiding mechanism is arranged on the base, and the centering guiding mechanism is configured to guide the container on the conveying belt to move to a center of the container taking and conveying assembly.

In an embodiment of the present disclosure, the anti-falling blocking edges extend from the first open end of the container taking and conveying assembly to the second open end; and the anti-falling blocking edges extend inwards in a middle area between the first open end and the second open end to form the centering guiding mechanism.

In an embodiment of the present disclosure, the bearing assembly further includes a conveying platform, the conveying platform is provided with a receiving end, an output end and a conveying platform surface located between the receiving end and the output end, and the conveying platform is configured to move a sorting target from the receiving end to the output end through the conveying platform surface; the taking and placing assembly further includes a grabbing mechanism configured to grab the sorting target outside the conveying platform surface onto the conveying platform surface; and the moving assembly further includes an avoiding mechanism configured to control a height of the grabbing mechanism so that the highest position of the grabbing mechanism is lower than the conveying platform surface of the conveying platform to allow the sorting target to move from the receiving end to the output end through the conveying platform surface.

In an embodiment of the present disclosure, the conveying platform includes a pair of conveying belts symmetrically assembled on the base, conveying surfaces of the conveying belts forming the conveying platform surface, an avoiding space being provided between the pair of conveying belts, and the grabbing mechanism being located in the avoiding space.

In an embodiment of the present disclosure, the grabbing mechanism includes a first guiding component, a guiding trajectory of the first guiding component being connected with the receiving end and the output end; and a suction cup component assembled on the first guiding component along the guiding trajectory in a guiding manner and configured to move the sorting target along the guiding trajectory.

In an embodiment of the present disclosure, the avoiding mechanism includes a lifter arranged on the base; and an end of the first guiding component towards the receiving end is a fixed end, an end of the first guiding component towards the output end is a movable end, the fixed end is assembled on the base in a hinged manner and is lower than the conveying platform surface, the lifter is connected with the movable end in a controlling manner, and the lifter is configured to control a height of the movable end to decrease to enable the grabbing mechanism to be lower than the conveying platform surface.

In an embodiment of the present disclosure, the lifter includes a telescopic rod assembled on the base in a hinged manner; and a transmission connecting rod, a telescopic end of the telescopic rod being hinged with one end of the transmission connecting rod, and the other end of the transmission connecting rod being hinged with the movable end.

In an embodiment of the present disclosure, the lifter further includes a support connecting rod, one end of the support connecting rod being hinged with the base, and the other end of the support connecting rod being hinged with the telescopic end of the telescopic rod.

In an embodiment of the present disclosure, the avoiding mechanism includes a second guiding component connected with the first guiding component, one end of an extension trajectory of the second guiding component being connected with the guiding trajectory of the first guiding component, and the other end of the extension trajectory of the second guiding component extending to a position below the conveying platform surface to allow the grabbing mechanism to move along the extension trajectory and be lower than the conveying platform surface.

According to a second aspect of the present disclosure, the present disclosure further provides a loading and unloading device, including a rack body, the above container taking and conveying assembly being arranged on the rack body, and the container taking and conveying assembly being configured to move on the rack body.

In an embodiment of the present disclosure, the rack body includes an X-axis rail and a Y-axis rail in directions perpendicular to each other; the Y-axis rail is configured to move along the X-axis rail; the container taking and conveying assembly is configured to move along the Y-axis rail; and the moving assembly is configured to drive the taking and placing assembly to move along a Z-axis direction in the first movement trajectory to load the container onto the bearing assembly.

In an embodiment of the present disclosure, the rack body includes a gantry assembly, and the X-axis rail includes a ground rail structure and a sky rail structure arranged on the gantry assembly; and two ends of the Y-axis rail are respectively guidably fitted with the ground rail structure and the sky rail structure.

In an embodiment of the present disclosure, at least two Y-axis rails are provided, and at least one container taking and conveying assembly is arranged on each Y-axis rail.

According to a third aspect of the present disclosure, the present disclosure further provides a picking system, including: a workstation area in which a picking station is arranged; a goods shelf parking area configured to park a goods shelf; and the above loading and unloading device configured to transfer the container between the workstation area and the goods shelf.

In an embodiment of the present disclosure, the workstation area further includes a conveying line, and the conveying line is configured to receive the container transferred from the container taking and conveying assembly or convey the container on the conveying line to the container taking and conveying assembly.

According to a fourth aspect of the present disclosure, the present disclosure further provides a logistics sorting system, including: the above container taking and conveying assembly; a goods shelf provided with several compartments for temporarily storing sorting targets; an alignment device connected with the container taking and conveying assembly in a driving manner and configured to drive the container taking and conveying assembly to move to a position of docking the compartment to receive the sorting target taken out from the compartment; and a transfer device configured to be fitted with the container taking and conveying assembly to receive the sorting target.

In an embodiment of the present disclosure, the alignment device includes a mechanical arm connected with the container taking and conveying assembly in a driving manner; or a horizontal rail having a horizontal guiding trajectory; a vertical rail movably assembled on the horizontal rail along the horizontal guiding trajectory, perpendicular to the horizontal rail and having a vertical guiding trajectory; and a moving member movably assembled on the vertical rail along the vertical guiding trajectory and connected with the container taking and conveying assembly.

According to a fifth aspect of the present disclosure, the present disclosure further provides a container taking method implemented by the above picking system, including: step S1000, driving, by a loading and unloading device, a container taking and conveying assembly to move to a target position; step S2000, controlling, by a driving assembly, a moving assembly to move in a first movement trajectory to drive a taking and placing assembly to load a container at the target position on a goods shelf onto a bearing assembly; step S3000, controlling, by the driving assembly, the moving assembly to move in a second movement trajectory to drive the taking and placing assembly to avoid an accommodating space of the bearing assembly; and step S4000, driving the container on the bearing assembly to move to a workstation area.

In an embodiment of the present disclosure, step S1000 includes: step S1100, driving, by the loading and unloading device, the container taking and conveying assembly to move to the target position according to a pre-stored coordinate in a system; and step S1200, acquiring position information marked on the goods shelf through a positioning system, and adjusting, by the loading and unloading device, a position of the container taking and conveying assembly based on an obtained position deviation.

In an embodiment of the present disclosure, step S2000 includes: step S2100, controlling, by the driving assembly, the moving assembly to move to a first position in the first movement trajectory to drive the taking and placing assembly to extend and load the container at the target position on the goods shelf; step S2200, controlling, by the driving assembly, the moving assembly to move towards a second position in the first movement trajectory, and moving, by the taking and placing assembly, the loaded container towards the accommodating space of the bearing assembly; and step S2300, in a case that a detection device detects that the container reaches the second position, releasing, by the taking and placing assembly, the container, the container being supported on the bearing assembly.

In an embodiment of the present disclosure, in step S3000, the driving assembly controls the moving assembly to move to a third position in the second movement trajectory, and the taking and placing assembly moves to a position below the bearing assembly to avoid the accommodating space of the bearing assembly.

According to a sixth aspect of the present disclosure, the present disclosure further provides a container conveying method implemented by the above picking system, including: step S1000, conveying a container in a workstation area to a bearing assembly of a container taking and conveying assembly; step S2000, driving, by a loading and unloading device, the container taking and conveying assembly to move to a target position; step S3000, driving the container on the bearing assembly to move to a preset position, and then controlling, by a driving assembly, a moving assembly to move to a first movement trajectory along a second movement trajectory to drive a taking and placing assembly to enter an accommodating space of the bearing assembly; and step S4000, controlling, by the driving assembly, the moving assembly to move in the first movement trajectory to enable the taking and placing assembly to push the container on the bearing assembly to the target position on a goods shelf for storage.

The present disclosure has the following beneficial effects: in the first movement trajectory, the moving assembly drives the taking and placing assembly to move in the accommodating space of the bearing assembly to load or unload the container; and in the second movement trajectory, the moving assembly drives the taking and placing assembly to leave the accommodating space of the bearing assembly, so that the container can be accommodated in the accommodating space or move in the accommodating space, For the container taking and conveying assembly in the present disclosure, the taking and placing assembly does not occupy the space of the bearing assembly, such that the container taking and conveying assembly has a more compact structure and thus can adapt to a narrow working space.

The present disclosure provides a container taking and conveying assembly that can be applied to a loading and unloading device for transferring containers between different target positions. The container taking and conveying assembly mainly includes a base. A bearing assembly and a taking and placing assembly are arranged on the base. The bearing assembly is configured to bear a container and is provided with an accommodating space for accommodating the container. The taking and placing assembly is configured to take out the container from a first target position and load it onto the bearing assembly, or to unload the container from the bearing assembly and place it at a second target position. The container in the present disclosure mainly refers to a container used for loading goods in logistics, including but not limited to material boxes, trays, packaging boxes, etc. . . . which are not limited here.

Movement trajectories of the taking and placing assembly include a first movement trajectory and a second movement trajectory. The container taking and conveying assembly further includes a moving assembly connected with the taking and placing assembly and configured to drive the taking and placing assembly to move in the first movement trajectory and the second movement trajectory, and a driving assembly configured to drive the moving assembly to move.

When the driving assembly drives the moving assembly to move in the first movement trajectory, the moving assembly is configured to drive the taking and placing assembly to move in the accommodating space of the bearing assembly, so as to load the container located at the first target position onto the bearing assembly through reciprocating movement such as extension and retraction, or unload the container from the bearing assembly and place it at the second target position.

The first target position and the second target position may be corresponding container positions on a goods shelf. The first target position and the second target position may be the same container position or different container positions, which are not limited here.

When the driving assembly drives the moving assembly to move in the second movement trajectory, the moving assembly is configured to drive the taking and placing assembly to leave the accommodating space of the bearing assembly to allow the container to enter the accommodating space of the bearing assembly and be borne on the bearing assembly.

For the container taking and conveying assembly in the present disclosure, in the first movement trajectory, the moving assembly drives the taking and placing assembly to move in the accommodating space of the bearing assembly to load or unload the container. In the second movement trajectory, the moving assembly drives the taking and placing assembly to leave the accommodating space of the bearing assembly, so that the container can be accommodated in the accommodating space or move in the accommodating space. For the container taking and conveying assembly in the present disclosure, the taking and placing assembly does not occupy the space of the bearing assembly, such that the container taking and conveying assembly has a more compact structure and thus can adapt to a narrow working space.

Embodiment 1

The base 1 provides support for the container taking and conveying assembly. As shown in FIG. 1, the base 1 may be arranged in any structure such as a flat plate or a frame, and may be arranged at the bottom of or around the bearing assembly 2. Those skilled in the art can choose the structure and position of the base. In a specific embodiment of the container taking and conveying assembly illustrated in FIG. 1, the base 1 is arranged in a frame structure and may be arranged below the bearing assembly 2 to support the bearing assembly 2. A bearing surface for supporting the container is arranged on the bearing assembly 2, and above the bearing surface is an accommodating space for accommodating the above container.

In an embodiment, the moving assembly 4 includes a guiding mechanism 41 and a sliding mechanism 42. As shown in FIG. 3 to FIG. 6, the guiding mechanism 41 includes a first guiding part 411 and a second guiding part 412 communicated with each other. The first guiding part 411 and the second guiding part 412 respectively define a first movement trajectory and a second movement trajectory of the moving assembly. That is, the moving assembly moves along the extension direction of the first guiding part 411 and the second guiding part 412, and can move along the first guiding part 411 to fit with the second guiding part 412.

The sliding mechanism 42 is fit with the guiding mechanism 41, and the sliding mechanism 42 is configured to move along the first guiding part 411 and the second guiding part 412. The taking and placing assembly 3 is connected with the sliding mechanism 42. When the sliding mechanism 42 moves along the first guiding part 411 and the second guiding part 412, it drives the taking and placing assembly 3 to move along the first movement trajectory and the second movement trajectory.

In a specific embodiment of the present disclosure, the first guiding part 411 is configured to extend linearly in a horizontal direction, and the second guiding part 412 and the first guiding part 411 are located in different directions. The sliding mechanism 42 is configured to move along the first guiding part 411, during which the taking and placing assembly 3 moves in a linear direction in the accommodating space of the bearing assembly 2. When the moving assembly 4 moves along the first guiding part 411, it can drive the taking and placing assembly 3 to load the container along the horizontal direction onto the bearing assembly 2.

Further, the moving assembly 4 is configured to move along the first guiding part 411 to the second guiding part 412, after which the taking and placing assembly 3 moves in a manner of gradually leaving the accommodating space until the taking and placing assembly 3 is located outside the accommodating space of the bearing assembly 2.

Specifically, when the taking and placing assembly 3 moves in the first movement trajectory, the taking and placing assembly 3 is located above the bearing assembly 2 and moves along the extension direction of the bearing assembly 2. The taking and placing assembly 3 can move from the accommodating space above the bearing assembly 2 until a front end of the bearing assembly 2 extends, thus loading the container located at the first target position in front of the bearing assembly 2. After the taking and placing assembly 3 moves in an opposite direction, it can move the loaded container to a position corresponding to the bearing assembly 2, thus placing the container on the bearing assembly 2.

Of course, in another application scenario, when the container is located on the bearing assembly 2, through the above same movement mode, the taking and placing assembly 3 can unload the container to the second target position.

Since the second guiding part 412 and the first guiding part 411 are located in different directions, when the moving assembly 4 moves along the second movement trajectory, the taking and placing assembly 3 can leave the accommodating space of the bearing assembly 2 in a manner of gradually deviating from the bearing assembly 2, and then the container can be fully moved onto the bearing assembly 2 or pass through the accommodating space of the bearing assembly 2.

In the guiding mechanism 41, the second guiding part 412 is connected with the end of the first guiding part 411 and deviates from the extension direction of the first guiding part 411.

In an embodiment of the present disclosure, after the sliding mechanism 42 moves in place along the second guiding part 412, the taking and placing assembly 3 is configured to move to one side of the bearing assembly 2 to leave the accommodating space of the bearing assembly 2. The "one side" in this position is relative to the extension direction of the bearing assembly 2. For example, referring to the view direction of FIG. 1, the bearing assembly 2 extends from left to right, and the "one side" in this position refers to the front or rear side of the bearing assembly 2.

In this embodiment, the first guiding part 411 may extend along the extension direction of the bearing assembly, and the second guiding part may be located in the same horizontal plane as the first guiding part 411 and extend in a direction away from or gradually away from one side of the bearing assembly.

In another embodiment of the present disclosure, the second guiding part 412 is configured to be located above the first guiding part 411. Specifically, the first guiding part 411 extends linearly in a horizontal direction, and the second guiding part 412 obliquely extends upwards relative to the first guiding part 411, thus forming an obtuse angle between the two guiding parts. After the moving assembly 4 moves in place along the second guiding part 412, the taking and placing assembly 3 is configured to move to a position above the bearing assembly 2 to leave the accommodating space of the bearing assembly 2. At this time, the distance between the taking and placing 3, the moving assembly 4 and the bearing assembly 2 should be higher than the height of the accommodating space.

In another embodiment of the present disclosure, as shown in FIG. 2 to FIG. 5, the second guiding part 412 is configured to be located below the first guiding part 411. Specifically, the first guiding part 411 extends linearly in a horizontal direction, and the second guiding part 412 is located in the same vertical plane as the first guiding part 411 and obliquely extends downwards relative to the first guiding part 411, thus forming an obtuse angle between the two guiding parts. After the moving assembly 4 moves in place along the second guiding part 412, the taking and placing assembly 3 is configured to move to a position below the bearing assembly 2 to avoid the accommodating space of the bearing assembly 2.

In this embodiment, the middle area of the bearing assembly 2 may be provided with a gap or space for the taking and placing assembly 3 and the moving assembly 4 to pass through. When the moving assembly 4 drives the taking and placing assembly 3 to move in the second movement trajectory, it can pass through the gap or space in the middle of the bearing assembly 2, thus moving to a position below the accommodating space.

The guiding means disclosed in the present disclosure may be any conventional guiding structure such as a guiding plate, a guiding rod or a rail. The first guiding part and the second guiding part may be sliding grooves or guiding holes arranged in the guiding mechanism, or two guiding rods arranged in different directions and connected at ends. The above guiding mechanism is only an example. Those skilled in the art understand that structures with two guiding parts in different directions are included in the scope of protection of the present disclosure.

Figure 2:
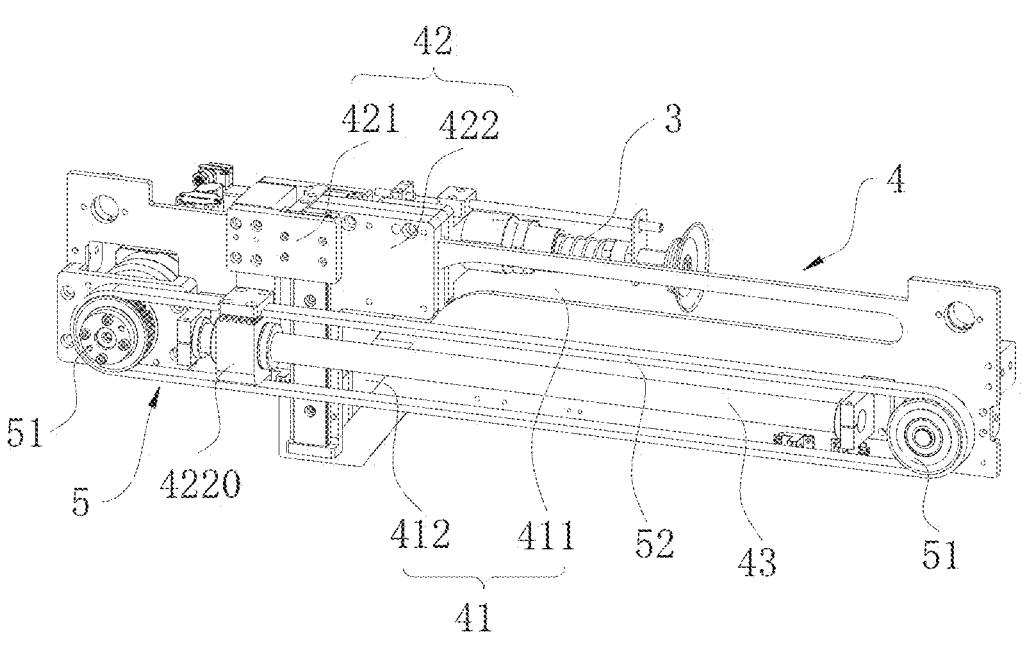
FIG. 2 illustrates a schematic structural diagram of a moving assembly and a driving assembly of a container taking and conveying assembly according to an embodiment of the present disclosure.
Figure 4:
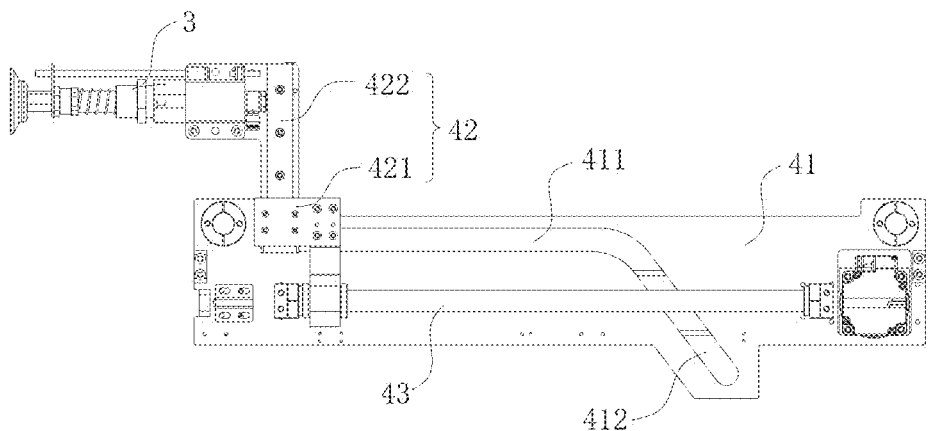
FIG. 4 illustrates a schematic diagram of a taking and placing assembly of a container taking and conveying assembly in a first movement trajectory according to an embodiment of the present disclosure.

In a specific embodiment of the present disclosure, as shown in FIG. 2 and FIG. 4, the guiding mechanism 41 is a guiding plate, the first guiding part 411 and the second guiding part 412 are guiding grooves arranged in the guiding plate and communicated with each other, and the sliding mechanism 42 is guidably fitted with the guiding grooves so that it can slide along the guiding grooves. The guiding grooves may be arranged in one side or opposite sides of the guiding plate, or may penetrate through two sides of the guiding plate to form run-through grooves. The guiding plate is vertically distributed relative to the bearing assembly, and an upper end surface of the guiding plate is lower than the bearing surface of the bearing assembly 2 to avoid the accommodating space. The first guiding part 41 is configured as a guiding groove extending along the horizontal direction. The second guiding part 42 is configured as a guiding groove obliquely extending downwards from an end of the first guiding part 411. When the sliding mechanism 42 drives the taking and placing assembly 3 to move along the second guiding part 412, it can pass through the gap or space in the middle of the bearing assembly 2 and move until the taking and placing assembly leaves the accommodating space of the bearing assembly.

Figure 3:
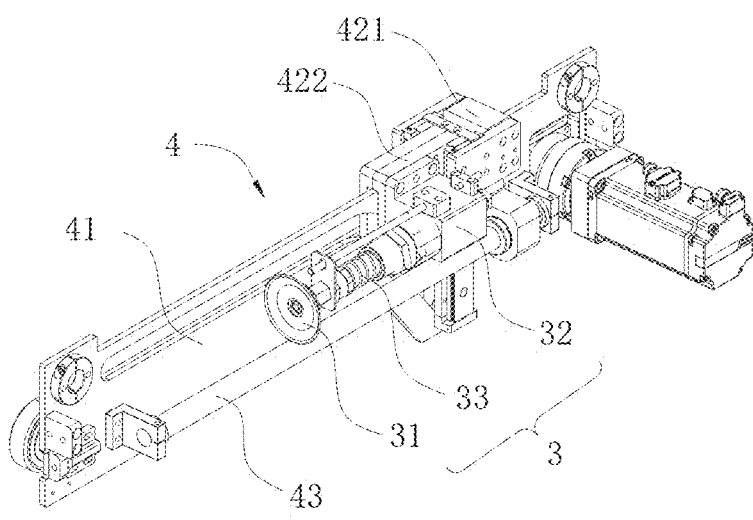
FIG. 3 illustrates a schematic structural diagram of a taking and placing assembly and a moving assembly of a container taking and conveying assembly according to an embodiment of the present disclosure.
Figure 5:
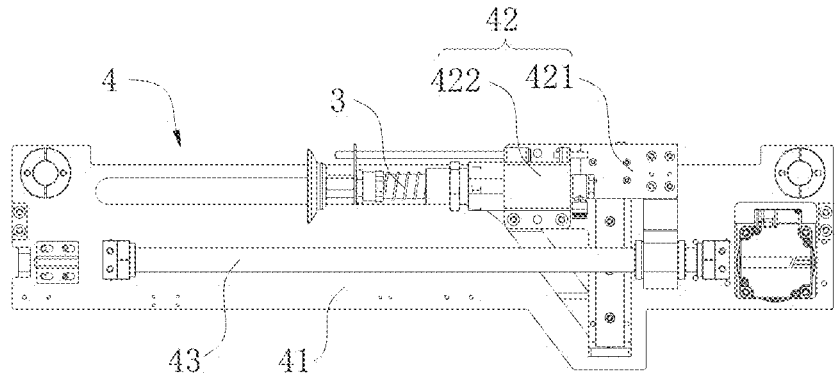
FIG. 5 illustrates a schematic diagram of a taking and placing assembly of a container taking and conveying assembly in a second movement trajectory according to an embodiment of the present disclosure.

In an embodiment of the present disclosure, referring to FIG. 3, FIG. 4 and FIG. 5, the sliding mechanism 42 includes a fixed part 421 and a sliding part 422. The fixed part 421 and the sliding part 422 are slidably fitted with each other, so that the sliding part 422 can slide relative to the fixed part 421 under the action of external force. The fixed part 421 is controlled by the driving assembly 5. The driving assembly 5 can provide a driving force for linear movement to drive the fixed part 421 to move linearly in a direction in parallel with the plane where the first guiding part 411 and the second guiding part 412 are located. The sliding part 422 is simultaneously guidably fitted with the first guiding part 411 and the second guiding part 412. The taking and placing assembly 3 is arranged on the sliding part 422. The sliding part 422 can drive the taking and placing assembly 3 to move along the first guiding part 411 and the second guiding part 412. The second guiding part 412 obliquely extends relative to the first guiding part 411, and forms an obtuse angle with the first guiding part 411.

The direction of relative movement between the fixed part 421 and the sliding part 422 may be configured to be perpendicular to the extension direction of the first guiding part 411. The driving assembly 5 can drive the sliding part 422 to move simultaneously through the fixed part 421, and the movement direction of the fixed part 421 is the same as the extension direction of the first guiding part 411, but not the same as the extension direction of the second guiding part 412.

Referring to FIG. 5, since the movement direction of the fixed part 421 is different from the extension direction of the second guiding part 412, when the driving assembly 5 drives the fixed part 421 to move linearly in the horizontal direction, the sliding part 422 gradually moves upwards relative to the fixed part 421 under the restriction of the second guiding part 412, thus driving the taking and placing assembly 3 to move upwards and enter the accommodating space of the bearing assembly 2. The reverse movement causes the taking and placing assembly 3 to leave the accommodating space of the bearing assembly 2.

Referring to FIG. 4, when the sliding part 422 moves into the first guiding part 411, since the movement direction of the fixed part 421 is the same as the extension direction of the first guiding part 411, the fixed part 421 and the sliding part 422 do not move relative to each other during the continuous movement of the fixed part 421. That is to say, the fixed part 421 and the sliding part 422 move linearly in the horizontal direction, so that the sliding part 422 can drive the taking and placing assembly 3 to move linearly in the accommodating space of the bearing assembly 2, so as to extend the driving assembly 3 and retract the taking and placing assembly 3 in the opposite direction.

Both the fixed part 421 and the sliding part 422 can be arranged as block structures. In a specific embodiment, in the view angles illustrated in FIG. 2 to FIG. 5, the guiding mechanism 41 is a vertically arranged guiding plate, and the first guiding part 411 and the second guiding part 412 are slots or run-through holes arranged in the guiding plate. The first guiding part 411 extends linearly in the horizontal direction, and the second guiding part 412 obliquely extends downwards relative to the first guiding part 411. The fixed part 421 may include two clamping plates. Top ends of the two clamping plates are connected together. A sliding groove is arranged between the two clamping plates of the fixed part 421. The sliding part 422 is clamped between the two clamping plates of the fixed part 421, is slidably fitted with the sliding groove in the fixed part 421, and can slide relative to the fixed part 421. The sliding part 422 further includes two clamping plates with top ends connected together. A gap is arranged between the two clamping plates. The guiding plate is located between the two clamping plates of the sliding part 422. A sliding member is further connected between the two clamping plates of the sliding part 422. The sliding member is slidably fit in the first guiding part 411 and the second guiding part 412. The sliding member may be a structure such as a pin or a sliding block, or may be a roller, which can reduce the friction with the guiding plate.

The driving assembly 5 provides a linear driving force. The sliding mechanism 42 and the guiding mechanism 41 are connected between the driving assembly 5 and the taking and placing assembly 3, which can convert the linear driving force of the driving assembly 5 into driving forces along the first guiding part 411 and the second guiding part 412, and drive the taking and placing assembly 3 to move in the first movement trajectory and the second movement trajectory in different directions.

The driving assembly 5 may be a linear motor, a lead screw assembly, a gear and rack, a conveyor belt, and the like. Driving devices that can achieve linear movement are all included in the scope of protection of the present disclosure. In a specific embodiment, the driving assembly 5 is a pulley structure. Referring to FIG. 2, it includes at least two pulleys 51, a conveyor belt 52 wound around the pulleys 51, and a motor that drives the pulleys 51 to rotate. An output end of the motor may be in direct connection with one of the pulleys 51, or may be in transmission connection with the pulley 51 through a transmission structure such as a gear assembly. The movement direction of the conveyor belt 52 is the same as the extension direction of the first guiding part 411. The fixed part 421 of the sliding mechanism 42 is fixedly connected onto the conveyor belt 52. By adjusting the rotation direction, the motor can drive the fixed part 421 to move back and forth through the pulleys 51 and the conveyor belt 52.

The driving assembly 5 may be mounted on the base 1 or the bearing assembly, or may be mounted on the guiding mechanism 41 of the moving assembly 4. In a specific embodiment, the guiding mechanism 41 is a guiding plate, and the pulleys 51 and the conveyor belt 52 of the driving assembly 5 are arranged on the guiding plate. Two pulleys 51 are arranged. The two pulleys 51 are respectively arranged at two ends of the first guiding part 411 and the second guiding part 412, and are rotatably connected onto the guiding plate through rotating shafts. A connecting member fixedly connected with the conveyor belt 52 is arranged on the fixed part 421.

In a specific embodiment, as shown in FIG. 2, the pulleys 51 and the conveyor belt 52 of the driving assembly 5 are arranged on one side of the guiding plate, and the taking and placing assembly 3 is arranged on the other side of the guiding plate to avoid interference with the driving mechanism during the movement of the taking and placing assembly 3. The motor may be arranged at one end of the guiding plate close to the second guiding part 412.

The strength of the conveyor belt 52 of the driving assembly 5 is relatively low. In order to improve the stability of the movement direction of the sliding part 422, at least one guiding rod 43 may be arranged. The extension direction of the guiding rod 43 is the same as the movement direction of the fixed part 421. The fixed part 421 is fit with the guiding rod 43. The fixed part 421 is configured to move linearly along the extension direction of the guiding rod 43 under the drive of the conveyor belt 52. The guiding rod 43 may be arranged on the base 1, the bearing assembly 2, the guiding mechanism 41, etc.

In the embodiment as shown in FIG. 2, the guiding rods 43 are connected onto the guiding plate. Specifically, two ends of two guiding rods 43 are respectively fixed on two sides of the guiding plate through mounting seats. A sliding block 4220 slidably fitted with the guiding rod 43 is arranged on the fixed part 421. The sliding block 4220 is arranged on the guiding rod 43 in a penetrating manner. Two guiding rods 43 are arranged. The two guiding rods 43 are respectively arranged on opposite sides of the guiding plate. Sliding blocks 4220 which slide along the two guiding rods 43 are respectively arranged on the two clamping plates of the fixed part 421.

The taking and placing assembly 3 may load the container in various ways, including but not limited to clamping fit, magnetic attraction, vacuum suction cup adsorption, etc. In a specific embodiment, the taking and placing assembly 3 includes a suction cup mechanism 31. The suction cup mechanism 31 is configured to be fitted with an end surface of the container to load the container. The taking and placing assembly 3 further includes a fixed seat 32. The suction cup mechanism 31 is connected onto the fixed seat 32. The fixed seat 32 is connected onto the sliding part 422 of the sliding mechanism 42.

In a specific embodiment of the present disclosure, referring to FIG. 3 and FIG. 5, a buffer device 33 may be mounted between the suction cup mechanism 31 and the fixed seat 32 to buffer the impact force of the suction cup mechanism 31 when the container is loaded. The buffer device 33 may include a spring connected between the suction cup mechanism 31 and the fixed seat 32. A certain amount of movement margin is provided between the suction cup mechanism 31 and the fixed seat 32. The suction cup mechanism 31 can overcome the acting force of the spring under the action of the external force and displace relative to the fixed seat 32, so that the spring can buffer the external force received by the suction cup mechanism 31.

The suction cup mechanism 31 may adopt vacuum suction cups, the number of which may be one or more and is not limited here. By controlling a vacuum source, the suction cup mechanism 31 can be controlled to adsorb the end surface of the container, or to release and place the container on the bearing assembly or the goods shelf.

In the above embodiment, the moving assembly drives the taking and placing assembly to move back and forth along the first guiding part, thus extending the taking and placing assembly to adsorb the container located at the first target position on the goods shelf and drive the container to move to the bearing assembly. At this time, the taking and placing assembly may release the container and place the container on the bearing assembly.

In an embodiment of the present disclosure, the taking and placing assembly can drive the container to fully move onto the bearing assembly, and then release the container to fully bear the container on the bearing assembly.

In an embodiment of the present disclosure, the taking and placing assembly can drive the container to move until part of the container is located on the bearing assembly. After the taking and placing assembly releases the container, it can be fully pushed onto the bearing assembly through a pushing device.

In a specific embodiment of the present disclosure, the bearing assembly 2 is configured to convey the container, and the two ends of the bearing assembly 2 may be marked as a first open end and a second open end, respectively. Referring to the view direction in FIG. 1, the left end of the bearing assembly 2 is the first open end and the right end is the second open end. The bearing assembly 2 can convey the container to move between the first open end and the second open end, and the accommodating space is arranged between the first open end and the second open end of the bearing assembly 2.

In an embodiment, as shown in FIG. 1 and FIG. 2, the bearing assembly 2 includes conveying belts 21. An upper surface of the conveying belts 21 is a bearing surface for supporting the container. The conveying belts 21 can convey the container in the horizontal direction, and the conveying direction of the conveying belts 21 is the same as the extension direction of the first guiding part 411. When the taking and placing assembly 3 loads the container and moves to a communicating position between the first movement trajectory and the second movement trajectory or a position adjacent to the communicating position, the container is driven to enter the first open end. At this time, the taking and placing assembly 3 releases the container and moves along the second movement trajectory to leave the accommodating space of the bearing assembly. Thereafter, the container can be moved by the conveying belt until it is fully borne on the conveying belts 21.

The bearing assembly 2 further includes a plurality of transmission rollers that are fit with the conveying belts 21, and a driving motor that drives the conveying belts 21 to rotate through the transmission rollers. In an embodiment, the bearing assembly 2 may be a belt conveyor. The structure and principle of the belt conveyor belong to the existing technology, which can be understood by those skilled in the art and will not be specifically described in the present disclosure.

In an embodiment, as shown in FIG. 1, two conveying belts 21 may be arranged. The two conveying belts 21 are arranged at an interval and are located on the same horizontal plane. The taking and placing assembly 3 and the moving assembly 4 may be arranged between the two conveying belts 21. The two conveying belts 21 move synchronously and convey the container at the same time. The two conveying belts 21 can be driven by using the same driving device. When the taking and placing assembly 3 moves in place along the first movement trajectory, it can extend out of the first open end from a position between the two conveying belts 21 to adsorb the end surface of the container. When the taking and placing assembly 3 moves in place along the second movement trajectory, it can retract to a position between the two conveying belts 21 and move to a position below the bearing surface.

In a specific application scenario of the present disclosure, the conveying belts 21 are further configured to convey the container from the first open end to the second open end, or from the second open end to the first open end. For example, through the conveying belts, the container can be conveyed to the second open end, to other target positions from the second open end, such as a workstation for sorting, or to a conveying line of the workstation. In addition, the container on the conveying line of the workstation may also enter the bearing assembly 2 through the second open end, and after reaching a corresponding position through the bearing assembly 2, the taking and placing assembly moves along the first guiding part, and pushes the container located on the bearing assembly 2 through the first open end to the target position on the goods shelf for storage. In this process, the taking and placing assembly may simply push the container to the target position on the goods shelf for storage through the pushing action only, or it may adsorb the container and push it to the target position on the goods shelf for storage.

In an embodiment, in order to prevent the container from falling from the two sides of the bearing assembly 2, anti-falling blocking edges 22 may be arranged on two sides of the base 1. The anti-falling blocking edges 22 are located on outer sides of the conveying belts, so that they can be configured to limit the container on the conveying belts 21. Specifically, the anti-falling blocking edges 22 on the two sides are arranged in strip structures and in the same direction as the conveying belts 21. The anti-falling blocking edges 22 may extend from the first open end of the bearing assembly to the second open end.

A centering guiding mechanism 23 may be further arranged on the base 1. The centering guiding mechanism 23 is configured to guide the container on the conveying belts 21 to move to a center of the bearing assembly. Specifically, as shown in FIG. 1, centering guiding mechanisms 23 are arranged on opposite sides of the base 1, and the centering guiding mechanisms 23 on the two sides are symmetrically arranged relative to the centerline of the bearing assembly 2. The ends of the centering guiding mechanisms 23 are arranged in flared structures, so as to help the container to enter a position between the centering guiding mechanisms 23 on the two sides.

The anti-falling blocking edges 22 and the centering guiding mechanisms 23 may be arranged independently of each other or as an integrated structure. In the embodiment as shown in FIG. 1, the anti-falling blocking edges 22 and the centering guiding mechanisms 23 are connected as a whole. The anti-falling blocking edges 22 extend inwards in the middle area between the first open end and the second open end to form the centering guiding mechanisms 23. The distance between the centering guiding mechanisms 23 on the two sides is smaller than the distance between the anti-falling blocking edges 22. In addition, the centering guiding mechanisms 23 are connected with the anti-falling blocking edges 22 at the two ends through inclined surfaces to form the flared structures, so as to help the container to enter a position between the centering guiding mechanisms 23.

In an embodiment, the container taking and conveying assembly further includes a detection device for detecting the position of the container. When the container is loaded and unloaded by the taking and placing assembly 3 and some of it is moved onto the bearing assembly 2, the detection device can detect the container. At this time, the taking and placing assembly 3 can place the container onto the bearing assembly 2, for example, by cutting off the vacuum source of the suction cup mechanism 31 to enable the suction cup mechanism 31 to release the container. Therefore, the detection position of the detection device determines when the taking and placing assembly 3 releases the container. The detection position of the detection device may be adjusted according to the design, as long as it can ultimately enable the container to be borne on the conveying belts. For example, the detection position of the detection position is that the moving assembly 4 moves to a position adjacent to the second guiding part in the first guiding part.

The detection device includes but is not limited to a sensor, an infrared scanning device, a camera device, and the like. The detection device can generate and send a detection signal when the container is detected. In an embodiment, the detection device may be a pressure sensor. The pressure sensor is arranged on the bearing assembly 2. When the container moves to a corresponding position on the bearing assembly 2. the pressure sensor can detect the pressure of the container and generate a detection signal. In another embodiment, it may be an infrared sensor and the like, which will not be specifically described here.

The container taking and conveying assembly in the present disclosure can be used for transferring the container on the goods shelf. When the container is transferred, the position of the container taking and conveying assembly needs to correspond to the target position on the goods shelf.

In actual warehousing environments, there are also factors such as uneven ground or goods shelf mounting errors, resulting in a deviation between the position of the container taking and conveying assembly and the target position on the goods shelf. In order to improve the position accuracy, the container taking and conveying assembly further includes a positioning system 6. The positioning system 6 is configured to determine relative positions of the container taking and conveying assembly and the goods shelf. When the positioning system 6 detects that the position deviation between the container taking and conveying assembly and the target position on the goods shelf reaches a preset range, it is necessary to adjust the position of the container taking and conveying assembly.

The positioning system may be a visual scanning module, a laser scanning module, or an infrared scanning module, which identifies the corresponding position on the goods shelf and obtains the position information of the container or container position. As shown in FIG. 1, the positioning system may be relatively arranged on the base 1. A bracket 11 can be arranged on the base 1. The bracket 11 is located above the bearing assembly 2 and avoids the accommodating space to avoid interference with the movement of the container. The bracket 11 may be arranged as a gantry-shaped structure. A bottom end of the bracket 11 is fixedly connected onto two sides of the first open end of the bearing assembly 2. The positioning system is mounted at a top of the bracket 11, and is located above the bearing assembly 2.

In a specific embodiment of the present disclosure, the positioning system 6 may be a 2D imaging module, and each container position on the goods shelf is correspondingly provided with a 2D identification located at the center of a front crossbeam of the container position. The 2D imaging module is configured to acquire the position information marked on the goods shelf.

The 2D imaging module may be arranged at the center position of the front end of the bearing assembly 2. This helps the 2D imaging module to read the position information marked on the front crossbeam. After acquiring the position information marked on the crossbeam, the 2D imaging module can obtain the height deviation and/or horizontal deviation of the container taking and conveying assembly relative to the target position, thus providing a reference for adjusting the position of the container taking and conveying assembly.

Embodiment 2

Figure 6:
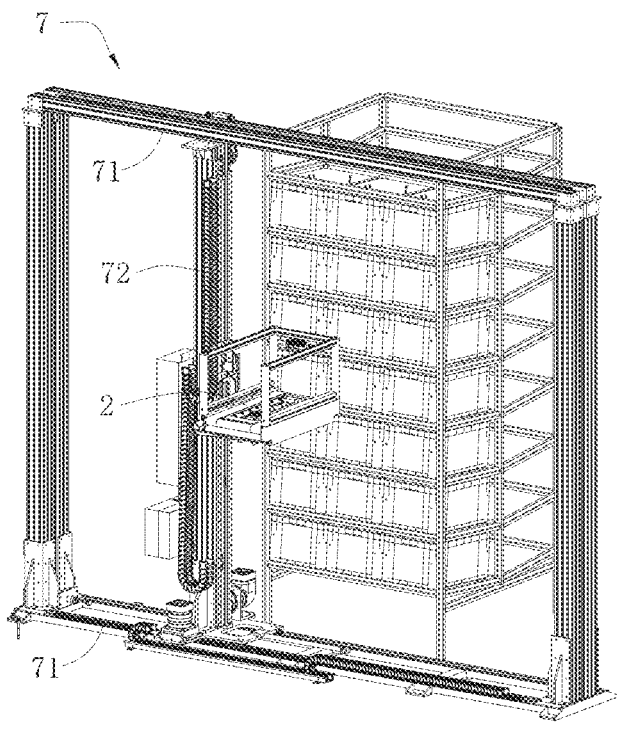
FIG. 6 illustrates an overall schematic structural diagram of a loading and unloading device according to an embodiment of the present disclosure.

This embodiment provides a loading and unloading device. As shown in FIG. 6, the loading and unloading device includes a rack body 7. The container taking and conveying assembly disclosed in embodiment 1 is arranged on the rack body 7. The container taking and conveying assembly is configured to move on the rack body 7. The position of the container taking and conveying assembly can be adjusted on the rack body. For the specific structure and principle of the container taking and conveying assembly, reference is made to embodiment 1, which will not be repeated in this embodiment.

Figure 7:
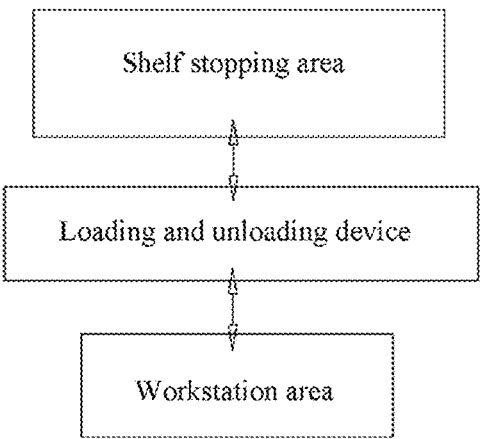
FIG. 7 illustrates a schematic diagram of a principle of a picking system according to an embodiment of the present disclosure.
Figure 10:
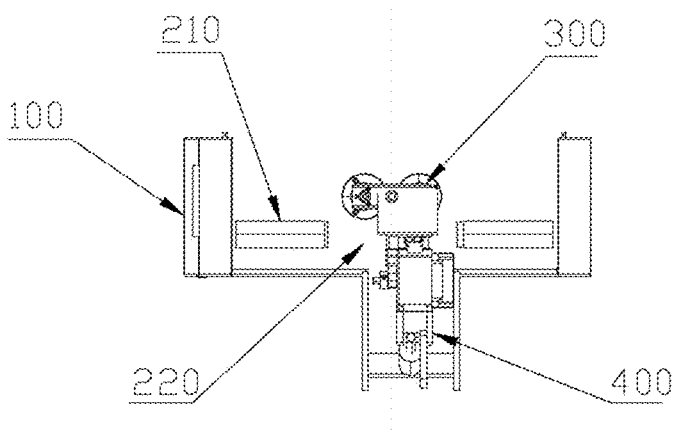
FIG. 10 illustrates a front diagram of a container taking and conveying assembly in a non-avoiding state according to an embodiment of the present disclosure.
Figure 11:
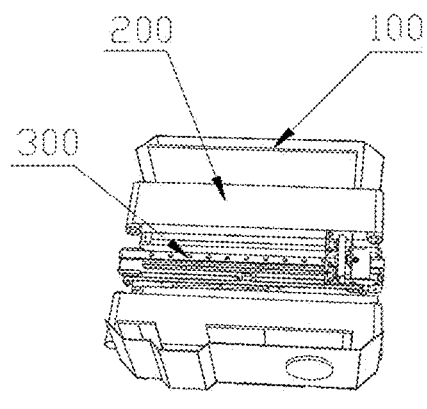
FIG. 11 illustrates a 3D diagram of the container taking and conveying assembly in the non-avoiding state illustrated in FIG. 10.
Figure 12:
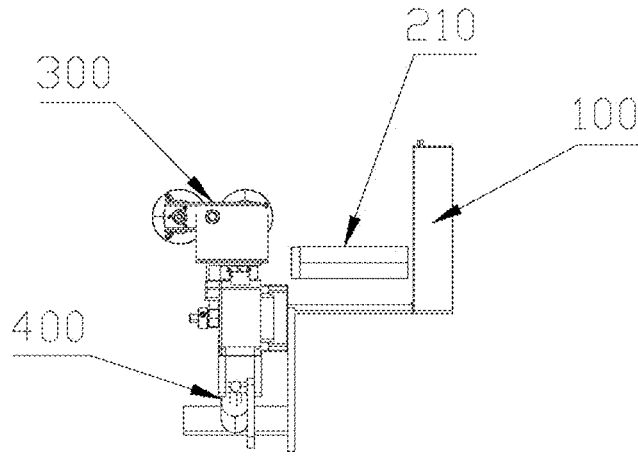
FIG. 12 illustrates a front diagram of a local structure of the container taking and conveying assembly in the non-avoiding state illustrated in FIG. 10.

Specifically, as shown in FIG. 7, the rack body 7 includes an X-axis rail 71 and a Y-axis rail 72 perpendicular to each other. The X-axis rail 71 and the Y-axis rail 72 are arranged on a vertical plane. Specifically, the Y-axis rail is configured to move along the X-axis rail, and the container taking and conveying assembly is configured to move along the Y-axis rail. The moving assembly 4 is configured to drive the taking and placing assembly 3 to move along a Z-axis direction in the first movement trajectory. The X-axis, Y-axis and the Z-axis form a 3D coordinate system.

In an embodiment, the rack body 7 includes a gantry assembly, and the X-axis rail 71 includes a ground rail structure and a sky rail structure arranged on the gantry assembly. The X-axis rail 71 extends along the horizontal direction, while the Y-axis rail 72 extends along the vertical direction. The Y-axis rail 72 may be a column structure. Two ends of the Y-axis rail 72 are respectively guidably fitted with the ground rail structure and the sky rail structure. The Y-axis rail 72 moves horizontally along the ground rail structure and the sky rail structure.

Specifically, X-axis moving plates are respectively arranged on two X-axis rails 71. The X-axis moving plates can move horizontally along the X-axis rails 71. Two ends of the Y-axis rail 72 are respectively and fixedly connected onto the two X-axis moving plates. A Y-axis moving plate is arranged on the Y-axis rail 72. The Y-axis moving plate can move vertically along the Y-axis rail 72. The container taking and conveying assembly is fixedly connected onto the Y-axis moving plate. Guiding assemblies may be further mounted on the X-axis moving plates and the Y-axis moving plate, which slide along the corresponding X-axis rails 71 and the Y-axis rails 72 through the guiding assemblies.

A driving system is further arranged on the rack body 7. The driving system includes an X-axis driving unit and a Y-axis driving unit. The X-axis driving unit is configured to drive the Y-axis rail 72 to move along the X-axis rails 71. The Y-axis driving unit is configured to drive the container taking and conveying assembly to move along the Y-axis rail 72, thus moving the container taking and conveying assembly to the corresponding position, for example, corresponding to the target position on the goods shelf. The driving system may include a drive motor, a transmission gear, a transmission chain, a lead screw assembly, etc., which can be arranged by those skilled in the art based on the existing technology to achieve the above functions of the driving system.

In an embodiment of the present disclosure, at least two Y-axis rails 72 may be arranged. The at least two Y-axis rails 72 move relatively independently between the upper and lower X-axis rails 71. At least one container taking and conveying assembly is arranged on each Y-axis rail. The container taking and conveying assembly on each Y-axis rail can move independently, thus improving the working efficiency of the loading and unloading device.

In this embodiment, the loading and unloading device is configured to transfer the container on the goods shelf, and the container taking and conveying assembly can move on the rack body 7 along the X-axis rails 71 and the Y-axis rails 72 to the target position on the goods shelf.

The container taking and conveying assembly is provided with a positioning system 6, which is configured to detect the position deviation between the container taking and conveying assembly and the target position on the goods shelf. The positioning system 6 may be a 2D imaging module such as a camera, or a 3D imaging module such as a depth camera or a panoramic camera, as long as it can acquire the position information of the target position.

In an embodiment, the positioning system 6 is a 2D imaging module. A 2D identification is correspondingly arranged at each container position on the goods shelf. The 2D imaging module is configured to acquire the position information marked on the goods shelf. Based on the marked position obtained by the 2D imaging module, it can comparatively analyze the position deviation between the container taking and conveying assembly and the marked position, including the deviation in the horizontal and vertical directions. Based on the deviation from the marked position obtained by the 2D imaging module, the container taking and conveying assembly can be adjusted through the X-axis rails 71 and the Y-axis rails 72 to improve the accuracy between the container taking and conveying assembly and the target position.

The X-axis rails 71 and the Y-axis rails 72 of the loading and unloading device are arranged as a frame-shaped structure, which, in fit with the compact container taking and conveying assembly, can be used to work in a relatively narrow working space, thus improving the space utilization rate and facilitating the increase of the capacity of the warehousing space.

Embodiment 3

This embodiment provides a picking system. As shown in FIG. 7, the picking system includes a workstation area, a goods shelf parking area, and the loading and unloading device disclosed in embodiment 2. For the specific structure and principle of the loading and unloading device, reference is made to embodiment 2 and embodiment 1, which will not be repeated in this embodiment.

The goods shelf parking area is configured to park the goods shelf. The loading and unloading device is configured to transfer the container between the workstation area and the goods shelf. A picking station is arranged in the workstation area. Goods in the container can be sorted at the picking station.

In an embodiment of the present disclosure, the workstation area may further include a conveying line. The conveying line can convey the container. The conveying line is configured to receive the container transferred from the container taking and conveying assembly. A worker located at the picking station can pick the container on the conveying line; or, the conveying line is configured to convey the container located on the conveying line to the container taking and conveying assembly. The container conveyed onto the container taking and conveying assembly is a container after picking is completed.

The loading and unloading device can load the container at the target position on the goods shelf according to the order, and then convey the target container to the conveying line in the workstation area. The worker at the picking station can pick the goods in the container on the conveying line according to the order. After picking is completed, the container is conveyed to the loading and unloading device through the conveying line, and the loading and unloading device can put the container back on the goods shelf. The picking system achieves the preliminary picking and transportation of the container through the loading and unloading device, thus achieving the transfer of the container between the goods shelf and the workstation area, effectively improving the efficiency of sorting work and reducing the human labor.

Embodiment 4

This embodiment discloses a container taking method implemented by the picking system disclosed in embodiment 3. As shown in FIG. 8, the container taking method includes the following steps:

In step S1000, a loading and unloading device drives a container taking and conveying assembly to move to a target position.

A business system sends an instruction of taking a container to a loading and unloading device. After receiving the business instruction, the loading and unloading device drives the container taking and conveying assembly to move to a target position based on container position information contained in the business instruction. The container position information may be pre-stored in the business system or a control system of the loading and unloading device in the form of coordinates. The loading and unloading device can perform corresponding operations based on the position information.

Based on the structure of the loading and unloading device in the present disclosure, the loading and unloading device includes X-axis rails 71 arranged in the horizontal direction and Y-axis rails 72 arranged in the vertical direction. After receiving the business instruction, the loading and unloading device drives the container taking and conveying assembly to move to the target position through movement in the X-axis direction and the Y-axis direction, corresponding to the target container position contained in the business instruction.

In an embodiment of the present disclosure, step S1000 includes:

In step S1100, the loading and unloading device drives the container taking and conveying assembly to move to the target position according to a pre-stored coordinate in a system.

Each container position on the goods shelf can be pre-stored in the system in the form of coordinates (x.y). After receiving the corresponding instruction, the loading and unloading device can control the X-axis rails 71 and the Y-axis rails 72 to move a corresponding distance according to the coordinate information of the target position contained in the instruction, thus driving the container taking and conveying assembly to the corresponding coordinate position and reaching the target position.

In step S1200, position information marked on the goods shelf is acquired through a positioning system, and the loading and unloading device adjusts the position of the container taking and conveying assembly based on an obtained position deviation.

An identification is arranged at the corresponding position of each container position on the goods shelf. When the container taking and conveying assembly moves to the target position on the goods shelf, the positioning system can recognize the identification at the target position on the goods shelf and obtain the position deviation between the target position and the container taking and conveying assembly. The loading and unloading device can adjust the position of the container taking and conveying assembly along the X-axis and the Y-axis based on the obtained position deviation, thus improving the accuracy of the position of the container taking and conveying assembly.

In an embodiment of the present disclosure, the loading and unloading device drives the container taking and conveying assembly to move to a position where the bearing surface of the bearing assembly is lower than the bearing surface for bearing the container at the container position on the goods shelf, which helps the taking and placing assembly to drag the container on the goods shelf onto the bearing assembly.

In step S2000, a driving assembly 5 controls a moving assembly 4 to move in a first movement trajectory to drive a taking and placing assembly 3 to load a container at the target position on a goods shelf onto a bearing assembly 2.

The driving assembly drives the taking and placing assembly 3 to move along the first movement trajectory through the moving assembly, so as to enable the taking and placing assembly to extend along the extension direction of the bearing assembly 2 in the accommodating space of the bearing assembly 2 to adsorb the container in front of the taking and placing assembly. The movement of the moving assembly in an opposite direction drives the taking and placing assembly to convey the container onto the bearing assembly 2.

In a specific embodiment of the present disclosure, step S2000 includes:

In step S2100, the driving assembly controls the moving assembly to move to a first position in the first movement trajectory to drive the taking and placing assembly to extend and load the container at the target position on the goods shelf.

At the first position, the taking and placing assembly can match the container at the target position on the goods shelf to load the container. When the taking and placing assembly 3 moves to the first position, the taking and placing assembly 3 extends out of the first open end of the bearing assembly 2, extends towards the container at the target position on the goods shelf, and fits with the end surface of the container to load the container. For example, when the taking and placing assembly 3 adopts a suction cup mechanism, the suction cup mechanism is fit with the end surface of the container at this position, so as to adsorb the container.

In step S2200, the driving assembly controls the moving assembly to move towards a second position in the first movement trajectory, and the taking and placing assembly moves the loaded container towards the accommodating space of the bearing assembly.

At the second position, the taking and placing assembly places the container on the bearing assembly. For example, when the taking and placing assembly is a suction cup mechanism, at the second position, a vacuum source of the suction cup mechanism is cut off to enable the container to be supported on the bearing assembly.

The second position may be arranged at a communicating position between the first movement trajectory and the second movement trajectory, or may be arranged at a position in the first movement trajectory adjacent to the communicating position between the first movement trajectory and the second movement trajectory. When the taking and placing assembly adsorbs the container and moves from the first position to the second position, the container moves towards the accommodating space of the bearing assembly, so as to enable the container to be completely or partially located on the bearing assembly.

In step S2300, in a case that a detection device detects that the container reaches the second position, the taking and placing assembly releases the container and the container is supported on the bearing assembly.

When the container moves to the second position, it can be detected by the detection device, and the taking and placing assembly can unload the container onto the bearing assembly. In the embodiment where the bearing assembly includes a conveying belt, the conveying belt is capable of fully moving the container into the accommodating space of the bearing assembly during operation.

In the embodiment where the taking and placing assembly includes a suction cup mechanism, when the container moves to the second position, the detection device sends a detection signal that the container is in place, so that the vacuum source of the suction cup mechanism can be cut off and the suction cup mechanism loads the container onto the conveying belt.

In step S3000, the driving assembly controls the moving assembly 4 to move in a second movement trajectory to drive the taking and placing assembly to avoid an accommodating space of the bearing assembly.

The sliding mechanism of the moving assembly 4 drives the taking and placing assembly 3 to move downwards to the second movement trajectory and drives the taking and placing assembly 3 to move to a position lower than the bearing surface of the bearing assembly 2, so as to avoid the accommodating space of the bearing assembly. At this time, the bearing assembly 2 can convey the container into the accommodating space.

In an embodiment, in step S3000, the driving assembly controls the moving assembly to move to a third position in the second movement trajectory, and the taking and placing assembly moves to a position below the bearing assembly to avoid the accommodating space of the bearing assembly.

The third position is located on the second movement trajectory, and the taking and placing assembly moves to a position below the bearing assembly to avoid the accommodating space, which allows the container to move along the bearing assembly 2 to the accommodating space or through the accommodating space without interfering with the taking and placing assembly, thus saving space of the container taking and conveying assembly and making the structure more compact.

In step S4000, the container on the bearing assembly 2 is driven to move to a workstation area.

After the container is moved to the bearing assembly 2, the X-axis rails 71 and Y-axis rails 72 of the loading and unloading device drive the container taking and conveying assembly to move from the target position to a position corresponding to a corresponding position in the workstation area, such as a position corresponding to the conveying line of the workstation. The conveying belt continuously conveys to transfer the container onto the conveying line of the workstation, so that the container can be picked at a picking station in the workstation area. The loading and unloading device achieves the automatic transfer of the container, thus reducing the labor cost and improving the work efficiency.

Embodiment 5

This embodiment discloses a container conveying method implemented by the picking system disclosed in embodiment 3. As shown in FIG. 9, the container conveying method includes the following steps:

In step S1000, a container in a workstation area is conveyed to a bearing assembly of a container taking and conveying assembly.

The container after picking in the workstation area needs to be conveyed back to the goods shelf. When the container is conveyed to the bearing assembly of the container taking and conveying assembly, the taking and placing assembly is located in the second movement trajectory, that is, the taking and placing assembly is located outside the accommodating space of the bearing assembly. At this time, the container located in the workstation area can be conveyed onto the bearing assembly of the container taking and conveying assembly.

For example, the container may be conveyed on the conveying line of the workstation area and enter the accommodating space of the bearing assembly through the second open end of the container taking and conveying assembly, ultimately enabling the container to be supported on the bearing assembly.

In step S2000, a loading and unloading device drives the container taking and conveying assembly to move to a target position.

The loading and unloading device can drive the container taking and conveying assembly to move to the target position through the X-axis rails 71 and the Y-axis rails 72. The method in this step is the same as the above movement mode, which will not be specified here.

In an embodiment of the present disclosure, the loading and unloading device drives the container taking and conveying assembly to move to a position where the bearing surface of the bearing assembly is higher than the bearing surface for bearing the container at the container position on the goods shelf, which helps the taking and placing assembly to push the container on the bearing assembly onto the container position on the goods shelf for storage.

In step S3000, the container on the bearing assembly is driven to move to a preset position, and then a driving assembly controls a moving assembly to move to a first movement trajectory along a second movement trajectory to drive the container taking and conveying assembly to enter an accommodating space of the bearing assembly.

After reaching the target position, the container on the bearing assembly may be driven to move to the preset position. The present position may be the above second position. Of course, for those skilled in the art, this step may also be performed before the container taking and conveying assembly moves, which is not limited here.

In the embodiment where the bearing assembly is a conveying belt, the container may be conveyed through the conveying belt. When the container is moved to the above second position, the moving assembly is controlled to move along the second movement trajectory to the first movement trajectory, so as to drive the taking and placing assembly to enter the accommodating space of the bearing assembly.

In step S4000, the driving assembly controls the moving assembly to move in the first movement trajectory to enable the taking and placing assembly to push the container on the bearing assembly to the target position on the goods shelf for storage.

Under the driving force of the driving assembly, the taking and placing assembly can push the container at the second position on the bearing assembly along the first movement trajectory, so as to push the container towards the direction of the first open end, and push the container to the target position on the goods shelf through the first open end for storage, thus completing the conveying step of the container on the goods shelf.

The loading and unloading device in the picking system can not only complete the work of taking the container, but also complete the work of conveying the container, thus improving the utilization rate and working efficiency of the equipment, reducing the human labor, effectively reducing the production cost, and achieving outstanding advantages.

Embodiment 6

This embodiment discloses another container taking and conveying assembly. As shown in FIG. 10 to FIG. 19, the other container taking and conveying assembly provided in this embodiment includes a base 1, a conveying platform 200, a grabbing mechanism 300 and an avoiding mechanism 400. The conveying platform 200 is arranged on the base 1. The conveying platform 200 is provided with a receiving end, an output end and a conveying platform surface located the receiving end and the output end. The conveying platform 200 is configured to move a sorting target from the receiving end to the output end through the conveying platform surface. The grabbing mechanism 300 is movably assembled on the base 1. The grabbing mechanism 300 is configured to grab the sorting target outside the conveying platform surface onto the conveying platform surface. The avoiding mechanism 400 is arranged on the base 1 and is connected with the grabbing mechanism 300 in a controlling manner. The avoiding mechanism 400 is configured to control a height of the grabbing mechanism 300 so that the highest position of the grabbing mechanism 300 is lower than the conveying platform surface of the conveying plat-form 200 to allow the sorting target to move from the receiving end to the output end through the conveying platform surface.

The container taking and conveying assembly can be used for automatically transferring goods on a goods shelf 500, and replacing the worker to take the goods on the goods shelf 500. Especially when the goods are placed at a higher position on the goods shelf 500, as long as the corresponding mechanical arm 610 and other structures are matched to enable the container taking and conveying assembly to move to the corresponding position of the goods, the container taking and conveying assembly can be used for automatically transferring the goods, thus achieving the purpose of taking the goods. Moreover, the container taking and conveying assembly can also be matched with a corresponding system for control to achieve the effect of quickly and automatically taking the goods through predetermined logic control, so as to improve the sorting efficiency. Therefore, the container taking and conveying assembly provides a possibility of automatically taking the goods and replacing the worker to actively take the goods on the goods shelf 500, and also provides a possibility of automatically and quickly sorting the goods.

When the container taking and conveying assembly is used for taking the goods, the container taking and conveying assembly firstly needs to reach a position where the goods are placed on the goods shelf 500. The grabbing mechanism 300 can grab the goods on the goods shelf 500 and then grab them onto the conveying platform surface of the conveying platform 200. The conveying platform 200 has a conveying function, which can move the goods on the conveying platform from the receiving end to the output end. Once the grabbing mechanism 300 grabs the goods onto the conveying platform surface, the grabbing mechanism 300 will lower the height through the control of the avoiding mechanism 400 and move to a position below the conveying platform 200 to prevent an obstruction from being formed in the movement of the goods from the receiving end to the output end.

The conveying platform 200 may adopt any structure that can transfer the goods, such as conveying belt 21, fluent bar platform surface, roller platform surface or ball platform surface. In an embodiment, the conveying platform 200 includes a pair of conveying belts 21 symmetrically assembled on the base 1, conveying surfaces of the conveying belts 21 form the conveying platform surface, an avoiding space 220 is provided between the pair of conveying belts 21, and the grabbing mechanism 300 is located in the avoiding space 220. In addition, the conveying platform 200 may also be composed of a fluent bar platform surface, a roller platform surface, or a ball platform surface that can also form the avoiding space 220 in the center, as long as it can form the avoiding space 220 that can be used for storing the grabbing mechanism 300. Moreover, in different structures of the conveying platform 200, the avoiding mechanism 400) is not limited to be located only in the center or is not absolutely located in the center.

As a component used for grabbing the goods, the grabbing mechanism 300 may adopt a mechanical gripper or a suction cup mechanism with a grabbing function. In a case that the goods are in an irregular shape, it is suitable to use a component such as a mechanical gripper. In a case that the goods are in a regular shape or placed in a regular storage box, a component such as a suction cup mechanism may be used. In an embodiment, the grabbing mechanism 300 includes a first guiding component 310 and a suction cup component 320, a guiding trajectory of the first guiding component 310 is connected with the receiving end and the output end, the suction cup component 320 is assembled on the first guiding component 310 along the guiding trajectory in a guiding manner, and the suction cup component 320 is configured to move the sorting target along the guiding trajectory. Therefore, the suction cup component 320 can be used for adsorbing the goods or storage boxes for loading the goods, so that the goods can be moved from the receiving end to the conveying platform 200, and then to the output end through the conveying platform 200.

As for the movement mode of the suction cup component 320 along the guiding trajectory from the receiving end to the output end on the first guiding component 310, any component with guiding and moving functions may be used. In an embodiment, the grabbing mechanism 300 further includes an electric control sliding block, which is assembled on the first guiding component 310 along the guiding trajectory in a guiding manner. The suction cup component 320 is assembled on the electric control sliding block, and then indirectly assembled on the first guiding component 310. For example, the first guiding component 310 may be an electric control guiding rail, and the electric control guiding rail is provided with an electric control sliding block for moving the suction cup component 320. The fit between the electric control guiding rail and the electric control sliding block may also meet logic control.

Figure 13:
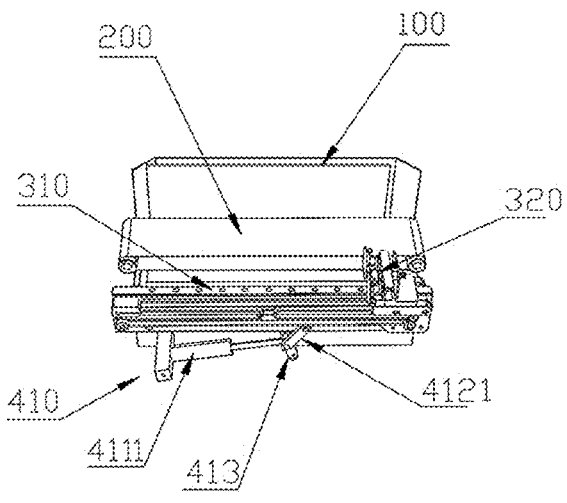
FIG. 13 illustrates a 3D diagram of a local structure of the container taking and conveying assembly in the non-avoiding state illustrated in FIG. 10.
Figure 14:
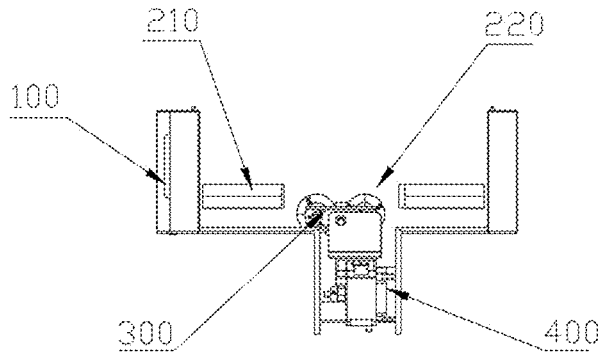
FIG. 14 illustrates a front diagram of a container taking and conveying assembly in an avoiding state according to an embodiment of the present disclosure.
Figure 15:
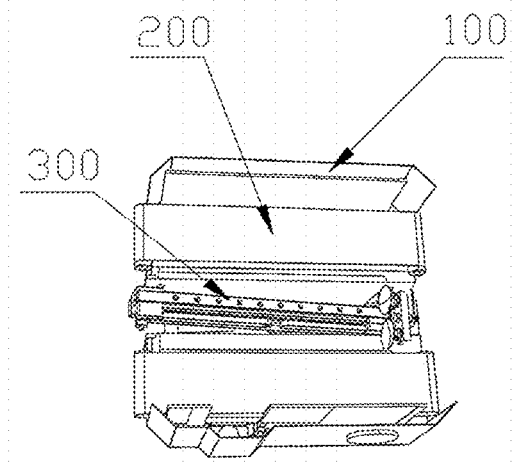
FIG. 15 illustrates a 3D diagram of the container taking and conveying assembly in the avoiding state illustrated in FIG. 14.
Figure 16:
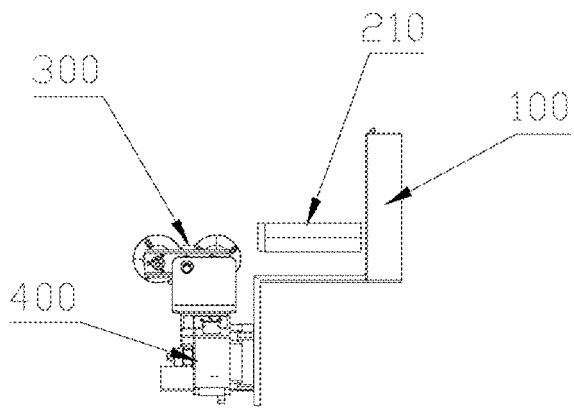
FIG. 16 illustrates a front diagram of a local structure of the container taking and conveying assembly in the avoiding state illustrated in FIG. 14.
Figure 17:
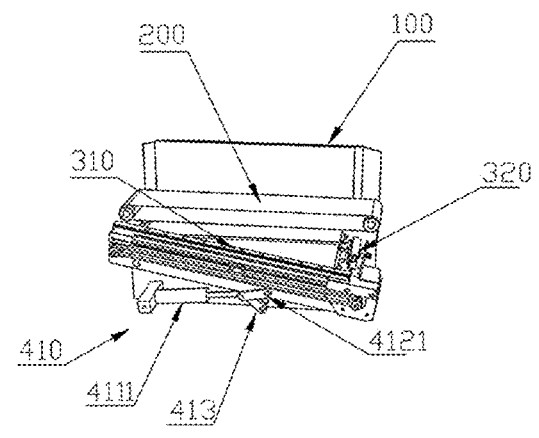
FIG. 17 illustrates a 3D diagram of a local structure of the container taking and conveying assembly in the avoiding state illustrated in FIG. 14.
Figure 18:
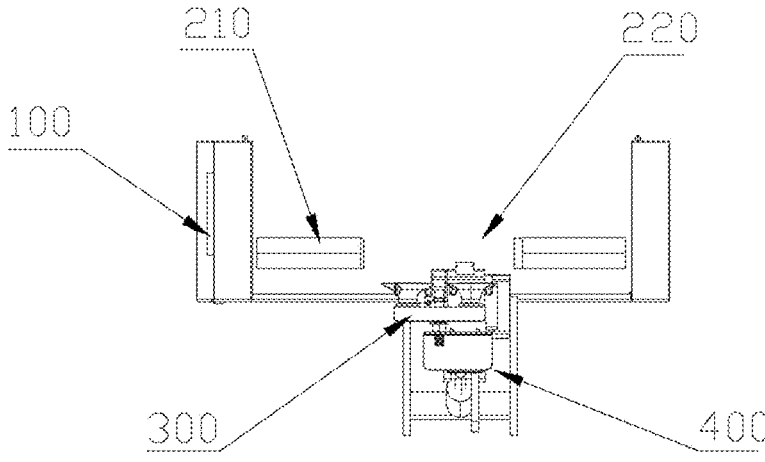
FIG. 18 illustrates a front diagram of a container taking and conveying assembly in an avoiding state according to another embodiment of the present disclosure.

The avoiding mechanism 400 can control the grabbing mechanism 300 to move to a position below the conveying platform surface in any way possible. As shown in FIG. 13 and FIG. 17, the avoiding mechanism 400 includes a lifter 410. The lifter 410 is arranged on the base 1. The end of the first guiding component 310 towards the receiving end is a fixed end. The end towards the output end is a movable end. The fixed end is assembled on the base 1 in a hinged manner and is lower than the conveying platform surface. The lifter 410 is connected with the movable end in a controlling manner. The lifter 410 is configured to control a height of the movable end to decrease to enable the grabbing mechanism 300 to be lower than the conveying platform surface.

After the goods are grabbed onto the conveying platform by the grabbing mechanism 300, the grabbing mechanism 300 temporarily completes the work task. At this time, in order to not obstruct the goods from moving from the receiving end to the output end on the conveying platform 200, the lifter 410 can control the movable end of the first guiding component 310 to reduce the height. As the height of the movable end decreases, the highest position of the grabbing mechanism 300 can be reduced until it is lowered to a position below the conveying platform surface and collected in the avoiding space 220, so that the movement space for moving the goods from the receiving end to the output end is fully empty, thus meeting the demand for moving the goods from the receiving end to the output end.

The lifter 410 may adopt a component with a lifting or retracting function, such as a telescopic cylinder, a telescopic hydraulic cylinder or a telescopic rod 4111. In an embodiment, the lifter 410 includes a telescopic rod 4111 and a transmission connecting rod 4121. The telescopic rod 4111 is assembled on the base 1 in a hinged manner. A telescopic end of the telescopic rod 4111 is hinged with one end of the transmission connecting rod 4121. The other end of the transmission connecting rod 4121 is hinged with the movable end. The transmission connecting rod 4121 can provide flexible movement control when the telescopic rod 4111 controls the movable end to reduce the height, thus enabling the telescopic rod 4111 to more flexibly drive the movable end to be lowered. In addition, the lifter 410 further includes a support connecting rod 413. One end of the support connecting rod 413 is hinged with the base 1, and the other end is hinged with the telescopic end of the telescopic rod 4111. The support connecting rod 413 can play a supporting role. Through the fit between the support connecting rod 413 and the transmission connecting rod 4121, the telescopic rod 4111 can more stably and flexibly drive the movable end to reduce the height.

Figure 19:
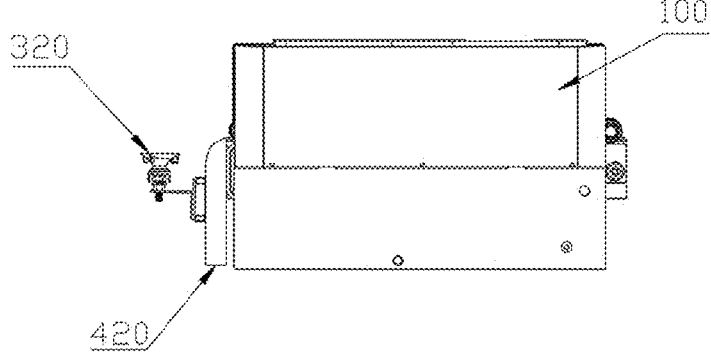
FIG. 19 illustrates a 3D diagram of the container taking and conveying assembly in the avoiding state illustrated in FIG. 18.
Figure 20:
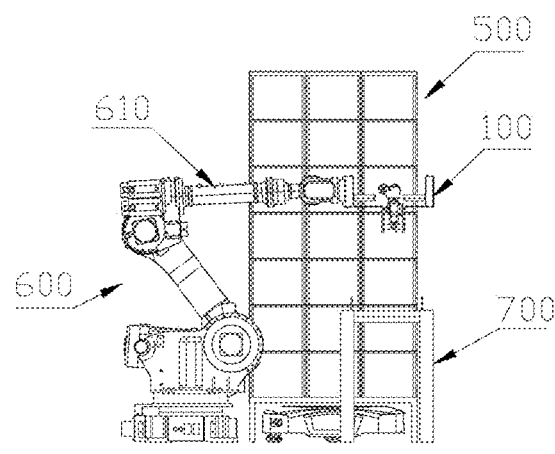
FIG. 20 illustrates a front diagram of a logistics sorting system according to an embodiment of the present disclosure.
Figure 21:
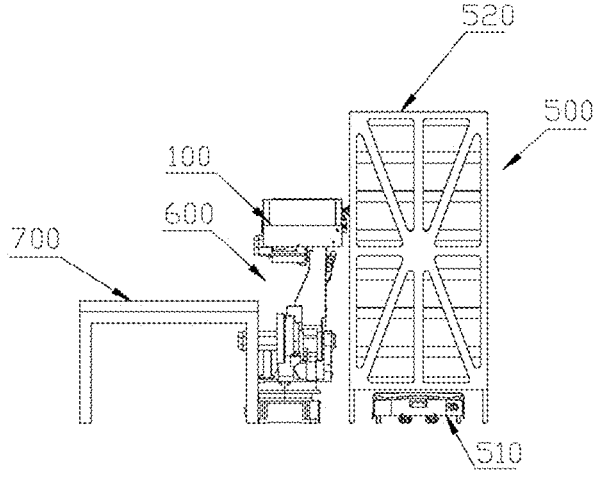
FIG. 21 illustrates a side diagram of the logistics sorting system illustrated in FIG. 20.
Figure 22:
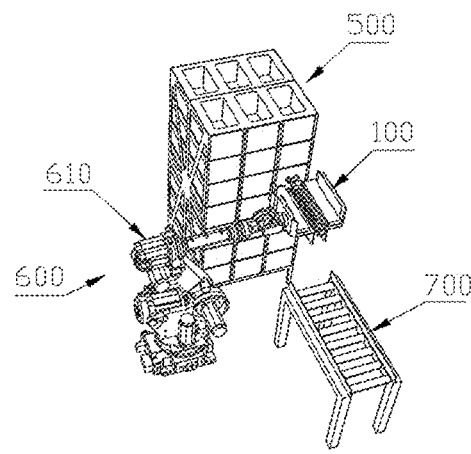
FIG. 22 illustrates a 3D diagram of the logistics sorting system illustrated in FIG. 20.
Figure 23:
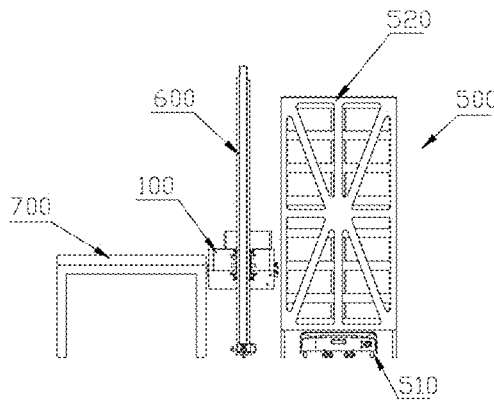
FIG. 23 illustrates a front diagram of a logistics sorting system in a first state according to another embodiment of the present disclosure.
Figure 24:
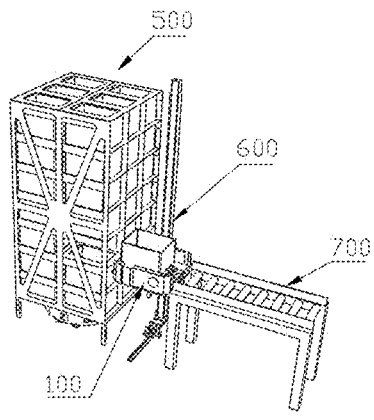
FIG. 24 illustrates a 3D diagram of the logistics sorting system in the first state illustrated in FIG. 23.
Figure 25:
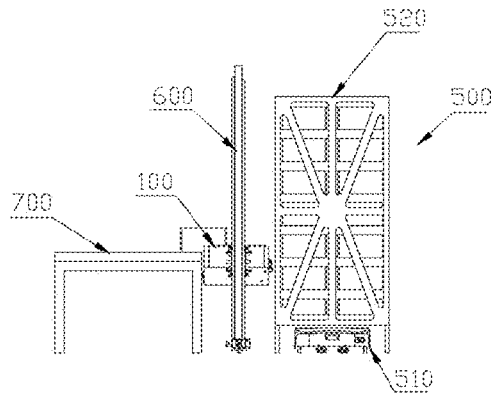
FIG. 25 illustrates a front diagram of a logistics sorting system in a second state according to another embodiment of the present disclosure.
Figure 26:
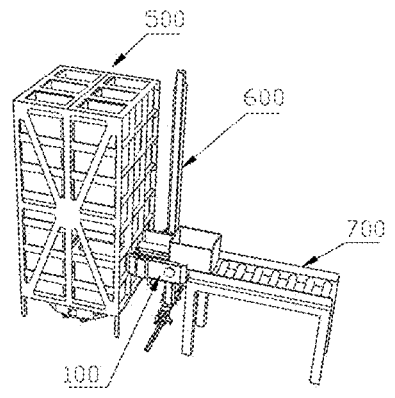
FIG. 26 illustrates a 3D diagram of the logistics sorting system in the second state illustrated in FIG. 25.
Figure 27:
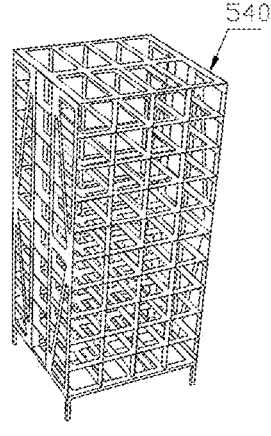
FIG. 27 illustrates a 3D diagram of a rack body according to an embodiment of the present disclosure.
Figure 28:
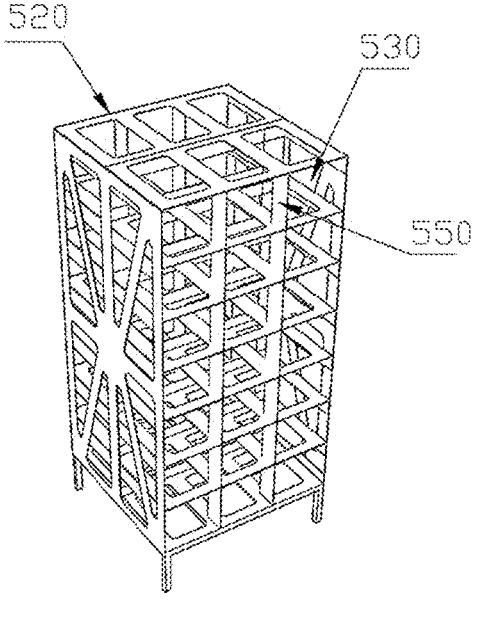
FIG. 28 illustrates a 3D diagram of a goods shelf according to an embodiment of the present disclosure.

In another embodiment, as shown in FIG. 19, the avoiding mechanism 400 includes a second guiding component 420 connected with the first guiding component 310, one end of an extension trajectory of the second guiding component 420 is connected with the guiding trajectory of the first guiding component 310, and the other end extends to a position below the conveying platform surface to allow the grabbing mechanism 300 to move along the extension trajectory and be lower than the conveying platform surface. In this embodiment, unlike the way that the lifter 410 controls the lowering of the movable end to achieve the avoiding effect, the function of the second guiding component 420 is to extend the guiding trajectory of the first guiding component 310 and extend the guiding trajectory to a position below the conveying plane using the extension trajectory.

After the goods are grabbed onto the conveying platform by the grabbing mechanism 300, the grabbing mechanism 300 temporarily completes the work task. At this time, in order to not obstruct the goods from moving from the receiving end to the output end on the conveying platform 200, the grabbing mechanism 300 may continuously move along the extension trajectory of the second guiding component 420 while moving along the first guiding component 310 to the output end, and move to a position below the conveying platform surface with change of the extension trajectory, so that the movement space for moving the goods from the receiving end to the output end is fully empty, thus meeting the demand for moving the goods from the receiving end to the output end.

For the extension direction of the second guiding component 420, it may be freely arranged as long as the grabbing mechanism 300 can move along the extension trajectory to a position below the conveying plane. For example, an included angle between the guiding trajectory and the extension trajectory is between 90 degrees and 150 degrees, preferably 90 degrees, so that the grabbing mechanism 300 can be shifted to a state of turning over for 90 degrees and be stored on one side of the conveying platform 200.

Embodiment 7

As shown in FIG. 20 to FIG. 28, the present disclosure further provides a logistics sorting system, which includes the container taking and conveying assembly, a goods shelf 500, an alignment device 600 and a transfer device 700. The goods shelf 500 is provided with several compartments 530 for temporarily storing sorting targets. The alignment device 600 is connected with the container taking and conveying assembly in a driving manner. The alignment device 600 is configured to drive the container taking and conveying assembly to move to a position of docking the compartment 530 to receive the sorting target taken out from the compartment 530. The transfer device 700 is configured to be fitted with the container taking and conveying assembly to receive the sorting target.

At this time, the goods shelf 500 can use the compartment 530 to hold the goods. The goods can be placed directly in the compartment 530 or stored in the compartment 530 through a regular storage box. The alignment device 600 can control the container taking and conveying assembly to reach the compartment 530 of the goods to be sorted, and then remove the goods from the compartment 530 to achieve identification and sorting of the goods, thus replacing the manual operation by the worker. This action may also be automatically completed by preset logic control, thus reducing the workload of the worker and improving the working efficiency through automated operation under logic control. After the container taking and conveying assembly transfers the goods to the transfer device 700, the transfer device 700 can continuously transfer the goods and proceed with the next sorting work.

The goods shelf 500 includes a chassis 510 and a rack body 7. The compartments 530 are located on the rack body 7. The rack body 7 is assembled on the chassis 510. The chassis 510 is configured to move the rack body 7. The chassis 510 may be an intelligent movable chassis 510 for automatic transfer and transfer of the goods shelf 500 to the target position through intelligent control in the logistics sorting system. The rack body 7 may include an outer frame 540) and inner partition plates 550. Several inner partition plates 550 are cross assembled along the transverse direction and the longitudinal direction to form the compartments 530. The thickness of the inner partition plates 550 ranges from 8 mm to 12 mm. For example, the thickness of the inner partition plates 550 is 8 mm, 9 mm, 10 mm, 11 mm, 12 mm, etc. The setting of the thickness of the inner partition plates 550 can save a lot of space on the goods shelf 500, thus making the goods shelf 500 not only lighter but also smaller in size, and effectively improving the storage efficiency. Moreover, the goods shelf 500 may use a large number of hollowed-out structures to further reduce the weight. The specific forms of the hollowed-out structures may be arranged according to the needs.

The alignment device 600 may adopt a mechanical arm 610. The mechanical arm 610 is connected with the container taking and conveying assembly in a driving manner, or the alignment device 600 may be composed of a horizontal rail, a vertical rail and a moving member to form a rectangular coordinate system. The horizontal rail has a horizontal guiding trajectory. The vertical rail is movably assembled on the horizontal rail along the horizontal guiding trajectory and is perpendicular to the horizontal rail. The vertical rail has a vertical guiding trajectory. The moving member is assembled on the vertical rail along the vertical guiding trajectory. The moving member is connected with the container taking and conveying assembly, so the vertical rail, the horizontal rail and the moving member can form movement in a 2D plane, thus completing the position movement of the container taking and conveying assembly. Of course, the moving member may also have another guiding trajectory, so that the container taking and conveying assembly can also be assembled relative to the moving member along the guiding trajectory, thus forming a 3D coordinate system, achieving the movement in the 3D space and improving the flexibility of movement.

The above has described various embodiments of the present disclosure. The above description is exemplary rather than exhaustive, and is not limited to the various embodiments disclosed. Many modifications and changes made without deviating from the scope and spirit of the various embodiments described are obvious to those skilled in the art. The selection of terms used herein aims to best describe the principle, practical application or technical improvement in the market of each embodiment, or to enable other ordinary technical personnel in the art to understand each embodiment disclosed herein. The scope of the present disclosure is defined by the attached claims.

The invention claimed is:

1. A container taking and conveying assembly, comprising a base and the following assemblies located on the base:
 a bearing assembly configured to bear a container, an accommodating space for accommodating the container being formed on the bearing assembly;
 a taking and placing assembly configured to take out the container from a first target position and load the container onto the bearing assembly, or unload the container from the bearing assembly and place the container at a second target position; and
 a moving assembly configured to drive the taking and placing assembly to move in a first movement trajectory and a second movement trajectory,
 in the first movement trajectory, the moving assembly being configured to drive the taking and placing assembly to move in the accommodating space of the bearing assembly to load or unload the container;
 in the second movement trajectory, the moving assembly being configured to drive the taking and placing assembly to leave the accommodating space of the bearing assembly to allow the container to enter the accommodating space and be borne on the bearing assembly, and
 wherein the container taking and conveying assembly further comprises a detection device for detecting a position of the container, the detection device being configured to detect the container and generate a detection signal to cause the taking and placing assembly to release the container, and the taking and placing assembly being configured to place the container on the bearing assembly in a case that the container is detected.

2. The container taking and conveying assembly according to claim 1, wherein the moving assembly comprises a guiding mechanism and a sliding mechanism, the guiding mechanism comprises a first guiding part and a second guiding part communicated with each other, and the sliding mechanism is configured to move along the first guiding part and the second guiding part; and
 the first guiding part and the second guiding part respectively define the first movement trajectory and the second movement trajectory of the sliding mechanism.

3. The container taking and conveying assembly according to claim 2, wherein the first guiding part is configured to extend linearly in a horizontal direction, and the second guiding part and the first guiding part are located in different directions;
 the sliding mechanism is configured to move along the first guiding part, during which the taking and placing assembly moves in a linear direction in the accommodating space of the bearing assembly; and
 the sliding mechanism is configured to move along the first guiding part to the second guiding part, after which the taking and placing assembly moves in a manner of gradually leaving the accommodating space of the bearing assembly,
 wherein the sliding mechanism is configured to move in place along the second guiding part, after which the taking and placing assembly is configured to move to one side of the bearing assembly to avoid the accommodating space of the bearing assembly.

4. The container taking and conveying assembly according to claim 3, wherein the second guiding part is configured to be located above the first guiding part; and the moving assembly is configured to move in place along the second guiding part, after which the taking and placing assembly is configured to move to a position above the bearing assembly to avoid the accommodating space of the bearing assembly; or
 wherein the second guiding part is configured to be located below the first guiding part; and the moving assembly is configured to move in place along the second guiding part, after which the taking and placing assembly is configured to move to a position below the bearing assembly to avoid the accommodating space of the bearing assembly,
 wherein the moving assembly is configured to move along the second guiding part to a position where the taking and placing assembly is lower than a bearing surface of the bearing assembly.

5. The container taking and conveying assembly according to claim 4, wherein the first guiding part and the second guiding part are guiding grooves arranged in the guiding mechanism, and the second guiding part is configured to obliquely extend downwards from an end of the first guiding part.

6. The container taking and conveying assembly according to claim 5, wherein the first guiding part and the second guiding part are located in the same plane; and the sliding mechanism comprises:
 a fixed part controlled by the moving assembly to move linearly in a direction in parallel with a plane in which the first guiding part and the second guiding part are located; and
 a sliding part slidably fitted with the fixed part and guidably fitted in the first guiding part and the second guiding part; and
 the taking and placing assembly is arranged on the sliding part.

7. The container taking and conveying assembly according to claim 6, wherein the moving assembly is a pulley structure, and the fixed part is connected to a conveyor belt of the pulley structure,
 wherein a guiding rod guidably fitted with the fixed part is arranged on the guiding mechanism; and the fixed part is configured to move linearly along an extension direction of the guiding rod under the drive of the conveyor belt.

8. The container taking and conveying assembly according to claim 6, wherein the guiding mechanism comprises a guiding plate distributed relative to a vertical direction, and an upper end surface of the guiding plate is lower than a bearing surface of the bearing assembly.

9. The container taking and conveying assembly according to claim 1, wherein the taking and placing assembly comprises a suction cup mechanism, and the suction cup mechanism is configured to be fitted with an end surface of the container.

10. The container taking and conveying assembly according to claim 1, further comprising:
 a positioning system arranged on the base, wherein the positioning system is configured to determine relative positions of the container taking and conveying assembly and a goods shelf.

11. The container taking and conveying assembly according to claim 1, wherein the container taking and conveying assembly comprises a first open end and a second open end; and the bearing assembly is a conveying belt, and the conveying belt is configured to drive the container to move to the first open end or the second open end of the container taking and conveying assembly.

12. The container taking and conveying assembly according to claim 1, wherein the bearing assembly further comprises a conveying platform, the conveying platform is provided with a receiving end, an output end and a conveying platform surface located between the receiving end and the output end, and the conveying platform is configured to move a sorting target from the receiving end to the output end through the conveying platform surface;

the taking and placing assembly further comprises a grabbing mechanism configured to grab the sorting target outside the conveying platform surface onto the conveying platform surface; and the moving assembly further comprises an avoiding mechanism configured to control a height of the grabbing mechanism so that the highest position of the grabbing mechanism is lower than the conveying platform surface of the conveying platform to allow the sorting target to move from the receiving end to the output end through the conveying platform surface.

13. The container taking and conveying assembly according to claim 12, wherein the conveying platform comprises:

a pair of conveying belts symmetrically assembled on the base, conveying surfaces of the conveying belts forming the conveying platform surface, an avoiding space being defined between the pair of conveying belts, and the grabbing mechanism being located in the avoiding space.

14. The container taking and conveying assembly according to claim 13, wherein the grabbing mechanism comprises:

a first guiding component, a guiding trajectory of the first guiding component being connected with the receiving end and the output end; and a suction cup component assembled on the first guiding component along the guiding trajectory in a guiding manner and configured to move the sorting target along the guiding trajectory.

15. The container taking and conveying assembly according to claim 14, wherein the avoiding mechanism comprises:

a lifter arranged on the base; and an end of the first guiding component towards the receiving end is a fixed end, an end of the first guiding component towards the output end is a movable end, the fixed end is assembled on the base in a hinged manner and is lower than the conveying platform surface, the lifter is connected with the movable end in a controlling manner, and the lifter is configured to control a height of the movable end to decrease to enable the grabbing mechanism to be lower than the conveying platform surface, wherein the lifter comprises:

a telescopic rod assembled on the base in a hinged manner; and a transmission connecting rod, a telescopic end of the telescopic rod being hinged with one end of the transmission connecting rod, and the other end of the transmission connecting rod being hinged with the movable end, wherein the lifter further comprises:

a support connecting rod, one end of the support connecting rod being hinged with the base, and the other end of the support connecting rod being hinged with the telescopic end of the telescopic rod.

16. The container taking and conveying assembly according to claim 14, wherein the avoiding mechanism comprises:

a second guiding component connected with the first guiding component, one end of an extension trajectory of the second guiding component being connected with the guiding trajectory of the first guiding component, and the other end of the extension trajectory of the second guiding component extending to a position below the conveying platform surface to allow the grabbing mechanism to move along the extension trajectory and be lower than the conveying platform surface.

17. A loading and unloading device, comprising:

a rack body; and a container taking and conveying assembly arranged on the rack body and configured to move on the rack body, wherein the container taking and conveying assembly comprises:

a bearing assembly configured to bear a container, an accommodating space for accommodating the container being formed on the bearing assembly;

a taking and placing assembly configured to take out the container from a first target position and load the container onto the bearing assembly, or unload the container from the bearing assembly and place the container at a second target position; and a moving assembly configured to drive the taking and placing assembly to move in a first movement trajectory and a second movement trajectory, in the first movement trajectory, the moving assembly being configured to drive the taking and placing assembly to move in the accommodating space of the bearing assembly to load or unload the container;

in the second movement trajectory, the moving assembly being configured to drive the taking and placing assembly to leave the accommodating space of the bearing assembly to allow the container to enter the accommodating space and be borne on the bearing assembly, and wherein the container taking and conveying assembly further comprises a detection device for detecting a position of the container, the detection device being configured to detect the container and generate a detection signal to cause the taking and placing assembly to release the container, and the taking and placing assembly being configured to place the container on the bearing assembly in a case that the container is detected.

18. The loading and unloading device according to claim 17, wherein the rack body comprises an X-axis rail and a Y-axis rail in directions perpendicular to each other; the Y-axis rail is configured to move along the X-axis rail; the container taking and conveying assembly is configured to move along the Y-axis rail; and the moving assembly is configured to drive the taking and placing assembly to move along a Z-axis direction in the first movement trajectory to load the container onto the bearing assembly, wherein the rack body comprises a gantry assembly, and the X-axis rail comprises a ground rail structure and a sky rail structure arranged on the gantry assembly; and two ends of the Y-axis rail are respectively guidably fitted with the ground rail structure and the sky rail structure.

19. A picking system, comprising:

a workstation area in which a picking station is arranged;

a goods shelf parking area configured to park a goods shelf; and a loading and unloading device configured to transfer the container between the workstation area and the goods shelf, and comprising:

a rack body; and a container taking and conveying assembly arranged on the rack body and configured to move on the rack body, wherein the container taking and conveying assembly comprises:

a bearing assembly configured to bear a container, an accommodating space for accommodating the container being formed on the bearing assembly;

a taking and placing assembly configured to take out the container from a first target position and load the container onto the bearing assembly, or unload the container from the bearing assembly and place the container at a second target position; and a moving assembly configured to drive the taking and placing assembly to move in a first movement trajectory and a second movement trajectory, in the first movement trajectory, the moving assembly being configured to drive the taking and placing assembly to move in the accommodating space of the bearing assembly to load or unload the container;

in the second movement trajectory, the moving assembly being configured to drive the taking and placing assembly to leave the accommodating space of the bearing assembly to allow the container to enter the accommodating space and be borne on the bearing assembly, and wherein the container taking and conveying assembly further comprises a detection device for detecting a position of the container, the detection device being configured to detect the container and generate a detection signal to cause the taking and placing assembly to release the container, and the taking and placing assembly being configured to place the container on the bearing assembly in a case that the container is detected.

20. The picking system according to claim 19, wherein the workstation area further comprises a conveying line, and the conveying line is configured to receive the container transferred from the container taking and conveying assembly or convey the container on the conveying line to the container taking and conveying assembly.

\* \* \* \* \*